United States Patent
Chen et al.

(10) Patent No.: US 10,134,364 B2
(45) Date of Patent: Nov. 20, 2018

(54) PRIORITIZED DISPLAY OF VISUAL CONTENT IN COMPUTER PRESENTATIONS

(71) Applicant: Google LLC, Mountain View, CA (US)

(72) Inventors: Xiaohui Chen, Sunnyvale, CA (US); Nathan Cordeiro, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/838,231

(22) Filed: Dec. 11, 2017

(65) Prior Publication Data

US 2018/0102111 A1   Apr. 12, 2018

Related U.S. Application Data

(63) Continuation of application No. 14/720,330, filed on May 22, 2015, now Pat. No. 9,870,755.

(51) Int. Cl.
*G09G 5/14* (2006.01)
*G09G 5/30* (2006.01)
(Continued)

(52) U.S. Cl.
CPC ......... *G09G 5/14* (2013.01); *G06F 17/30017* (2013.01); *G09G 5/005* (2013.01);
(Continued)

(58) Field of Classification Search
CPC ............ G09G 5/14; G09G 5/005; G09G 5/30; G09G 2340/0464; G09G 2340/0442;
(Continued)

(56) References Cited

U.S. PATENT DOCUMENTS

2002/0067433 A1   6/2002   Yui et al.
2002/0131622 A1   9/2002   Lee et al.
(Continued)

FOREIGN PATENT DOCUMENTS

WO   2008/027724   3/2008

OTHER PUBLICATIONS

EPO, Communication Pursuant to Rules 161(1) and 162 EPC for European Patent Application No. 16723904.5, dated Jan. 8, 2018, 3 pages.
(Continued)

*Primary Examiner* — Ke Xiao
*Assistant Examiner* — Kim-Thanh T Tran
(74) *Attorney, Agent, or Firm* — IP Spring

(57) ABSTRACT

Implementations relate to prioritized display of visual content in computer presentations. In some implementations, a computer-executed method includes obtaining first visual content and second visual content associated with the first visual content, where the first and second visual content include a plurality of pixels. The method provides a display of a computer presentation by a display device, where the first visual content is displayed in a presentation area of the computer presentation. The method determines that a first presentation priority of at least a portion of the first visual content is reduced based on a determination that less than a threshold amount of the at least a portion of the first visual content has changed. In response to determining that the first presentation priority is reduced, the method improves a visibility of a display of the second visual content in the computer presentation.

20 Claims, 11 Drawing Sheets

(51) Int. Cl.
   *G09G 5/00*    (2006.01)
   *G06F 17/30*   (2006.01)
   *H04N 7/15*    (2006.01)
   *H04M 3/56*    (2006.01)
   *H04N 7/14*    (2006.01)

(52) U.S. Cl.
   CPC .............. *G09G 5/30* (2013.01); *H04M 3/567* (2013.01); *H04N 7/147* (2013.01); *H04N 7/15* (2013.01); *G09G 2340/0442* (2013.01); *G09G 2340/0464* (2013.01)

(58) Field of Classification Search
   CPC ...... G09G 5/377; G09G 5/36; G09G 2370/20; G09G 2350/00; G09G 2340/12; H04M 3/567; H04N 7/15; H04N 7/147; G06F 17/30017; G06T 1/20
   USPC ......................................................... 345/660
   See application file for complete search history.

(56) References Cited

U.S. PATENT DOCUMENTS

| | | | |
|---|---|---|---|
| 2003/0081739 A1* | 5/2003 | Hikishima | H04M 1/6058 379/88.01 |
| 2003/0197744 A1 | 10/2003 | Irvine | |
| 2004/0230651 A1 | 11/2004 | Ivashin | |
| 2005/0264648 A1* | 12/2005 | Ivashin | H04N 7/152 348/14.09 |
| 2008/0144107 A1 | 6/2008 | Lieb | |
| 2008/0232764 A1 | 9/2008 | Lawther | |
| 2011/0279228 A1 | 11/2011 | Kumar | |
| 2012/0017149 A1 | 1/2012 | Lai et al. | |
| 2012/0026277 A1* | 2/2012 | Malzbender | H04N 7/15 348/14.07 |
| 2012/0154311 A1 | 6/2012 | Iijima et al. | |
| 2012/0262537 A1 | 10/2012 | Baker et al. | |
| 2013/0132852 A1 | 5/2013 | Sommer | |
| 2013/0328767 A1* | 12/2013 | Itoh | G06F 3/017 345/156 |
| 2014/0028781 A1 | 1/2014 | MacDonald | |
| 2015/0245095 A1 | 8/2015 | Gonzalez | |

OTHER PUBLICATIONS

European Patent Office, International Search Report for International Patent Application No. PCT/EP2016/031351, dated Jul. 21, 2016, 6 pages.

European Patent Office, Written Opinion for International Patent Application No. PCT/EP2016/031351, dated Jul. 21, 2016, 7 pages.

International Bureau of WIPO, International Preliminary Report on Patentability for International Patent Application No. PCT/EP2016/031351, dated Nov. 28, 2017, 9 pages.

USPTO, Notice of Allowance for U.S. Appl. No. 14/720,330, dated Sep. 11, 2017, 11 pages.

USPTO, Non-final Office Action for U.S. Appl. No. 14/720,330, dated Nov. 4, 2016, 20 pages.

USPTO, Final Office Action for U.S. Appl. No. 14/720,330, dated Jun. 2, 2017, 29 pages.

* cited by examiner

PRIORITIZED DISPLAY OF VISUAL CONTENT IN COMPUTER PRESENTATIONS

CROSS REFERENCE TO RELATED APPLICATIONS

The present application is a continuation of U.S. patent application Ser. No. 14/720,330, filed May 22, 2015 and titled PRIORITIZED DISPLAY OF VISUAL CONTENT IN COMPUTER PRESENTATIONS, the contents of which are incorporated herein by reference in its entirety.

BACKGROUND

The popularity and convenience of graphical displays and Internet communications have allowed computer presentations to become widely used. For example, video or slide presentations of information can be displayed to people who may be physically present in areas such as conference rooms or remotely connected by computer networks. In some cases, speakers can provide verbal commentary to explain and describe information they are presenting via computer displays.

SUMMARY

Implementations of the present application relate to prioritized display of visual content in computer presentations. In some implementations, a computer-implemented method to prioritize display of visual content in a computer presentation includes obtaining first visual content and second visual content associated with the first visual content, where the first visual content and the second visual content include a plurality of pixels. The method provides a display of a computer presentation by a display device, where the computer presentation includes first visual content displayed in a presentation area of the computer presentation. The method determines that a first presentation priority of at least a portion of the first visual content is reduced based on a determination that less than a threshold amount of the at least a portion of the first visual content has changed, and, in response to determining that the first presentation priority is reduced, the method improves a visibility of a display of the second visual content in the computer presentation.

Various implementations and examples of the method are described. For example, determining that the first presentation priority is reduced can include determining that, for at least a threshold period of time, less than a threshold number of pixels in the at least a portion of the first visual content have changed. Determining that the first presentation priority is reduced can include determining that less than a threshold number of pixels in the at least a portion of the first visual content have changed in their pixel values by at least a value threshold amount. Determining that the first presentation priority is reduced can include determining that a portion of the first visual content is reduced in the first presentation priority relative to presentation priorities of one or more other portions of the first visual content. Determining that the first presentation priority is reduced can include determining that the first presentation priority is reduced relative to a second presentation priority associated with the second visual content. The method can further include, in response to determining that the first presentation priority is reduced, changing a respective visibility of the at least a portion of the first visual content and the second visual content in the computer presentation in accordance with the reduction of the first presentation priority.

Improving a visibility of the second visual content can include at least one of: adding the display of the second visual content to the computer presentation, and increasing a size of the display of the second visual content in the computer presentation. In some examples, a user pointer can be displayed in the computer presentation, the user pointer having a displayed position in the computer presentation controlled by a user and referencing the display of the first visual content, where determining that the first presentation priority is reduced can include determining that the position of the user pointer has been different than a displayed position of the at least a portion of the first visual content for at least a threshold period of time. In another example, determining that the first presentation priority is reduced includes determining that the position of the user pointer in the computer presentation is at least a threshold distance from a displayed position of the at least one portion of the first visual content. The method can further include determining that the first presentation priority is additionally reduced, and in response to such determination, further improving the visibility of the second visual content by increasing the size of the display of the second visual content.

The method can further include, after the improving the visibility of the display of the second visual content, determining that the first presentation priority is increased based on a second determination that more than a second threshold amount of the at least a portion of the first visual content has changed; and in response to determining that the first presentation priority is increased, improving the visibility of the display of the first visual content in the computer presentation. For example, improving the visibility of the display of the first visual content can include at least one of: removing the display of the second visual content, changing a display position of the display of the second visual content, and decreasing a size of the display of the second visual content in the computer presentation. In some examples, a user pointer is displayed in the computer presentation, the user pointer having a position in the computer presentation controlled by a user and referencing the display of the first visual content, where determining that the first presentation priority is increased can include determining that the user pointer has moved into at least a portion of a display area of the second visual content, and/or that the user pointer is pointing to a portion of the first visual content that is at least partially overlaid by the second visual content. In some examples, the first visual content can be included in a first data stream having a plurality of frames, and the second visual content can be included in a second data stream having a plurality of frames, where the second data stream can include a visual representation of at least one user associated with the computer presentation. For example, the first data stream can include a sequence of slides and the second data stream includes audio data derived from verbal speech provided by the at least one associated user.

In some implementations, a system to prioritize display of visual content in a computer presentation includes a storage device; and at least one processor operative to access the storage device and operative to perform operations. The operations can include obtaining first visual content and second visual content associated with the first visual content, where the first visual content and second visual content include a plurality of pixels. The operations include providing a display of a computer presentation by a display device, where the computer presentation includes first visual content displayed in a presentation area of the computer presentation. The operations include determining that a first presentation priority of at least a portion of the first visual content is reduced based on a determination that, for at least a threshold period of time, less than a threshold amount of the at least a portion of the first visual content has changed. In response to determining that the first presentation priority is reduced, a visibility of a display of the second visual content in the computer presentation is improved.

Various implementations and examples of the system are described. For example, the operation of determining that the first presentation priority is reduced can include performing motion detection on at least a portion of the first visual content to determine that less than a threshold amount of the at least a portion of the first visual content has changed, and improving a visibility of the second visual content can include at least one of: adding the display of the second visual content to the computer presentation, and increasing a size of the display of the second visual content in the computer presentation. The system can further include operations after the improving the visibility of the display of the second visual content, the operations including determining that the first presentation priority is increased based on a determination that more than a threshold amount of the at least a portion of the first visual content has changed, and, in response to determining that the first presentation priority is increased, improving the visibility of the display of the first visual content in the computer presentation by removing the display of the second visual content from the computer presentation.

In some implementations, a computer readable medium can have stored thereon software instructions that, when executed by a processor, cause the processor to prioritize display of visual content in a computer presentation by performing operations. The operations include obtaining first visual content and second visual content associated with the first visual content, where the first visual content and second visual content each include a plurality of frames to be displayed in sequence, each frame including a plurality of pixels. The operations include providing a display of a computer presentation by a display device, the computer presentation including the first visual content displayed in a presentation area of the computer presentation. The operations include determining that one of the frames of the first visual content has been displayed in the presentation area for at least a threshold amount of time, and, in response to the determination, improving a visibility of a display of the second visual content in the computer presentation.

Various implementations and examples of the computer readable medium are described. For example, improving a visibility of the second visual content can include at least one of: adding the display of the second visual content to the computer presentation, and increasing a size of the display of the second visual content in the computer presentation. Furthermore, the operations can further include, after the improving the visibility of the display of the second visual content, determining that the first presentation priority is increased based on a determination that more than a threshold amount of the at least a portion of the first visual content has changed, and in response to determining that the first presentation priority is increased, improving the visibility of the display of the first visual content in the computer presentation. Improving the visibility of the display of the first visual content can include at least one of: removing the display of the second visual content, moving the display of the second visual content, and decreasing a size of the display of the second visual content in the computer presentation.

DETAILED DESCRIPTION

Figure 1:
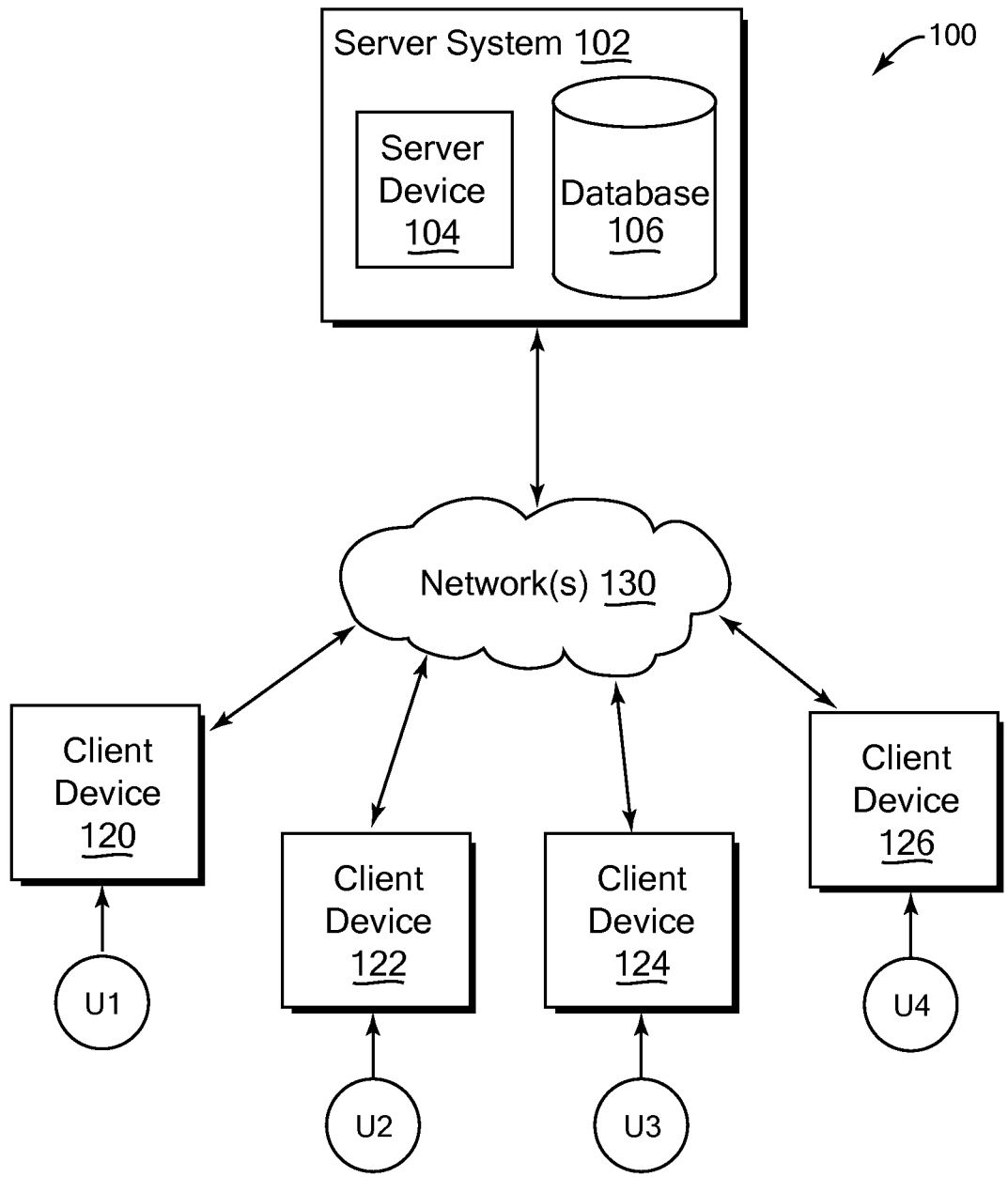
FIG. 1 is a block diagram of an example network environment which may be used for one or more implementations described herein.

One or more implementations described herein relate to prioritized display of visual content in computer presentations. In some implementations, a system can determine priorities of displayed visual content and provide changes in visibility of visual content in a computer presentation (e.g., video presentation) based on the priorities. Described features can allow for example, automatically improving visibility of accompanying second visual content in a displayed computer presentation when it is detected that the focus of the presentation may have shifted away from first visual content being displayed. The features can also allow, for example, automatic reduction in visibility of the second visual content when presentation focus is detected to have returned to the first visual content.

In some examples, a system can obtain and display first visual content, e.g., a stream or sequence of slides of information or other visual content. The system can also obtain second visual content, e.g., associated with the first visual content, such as an accompanying video stream showing a speaker who provides verbal speech, e.g., commentary related to the information presented in the first visual content. The system can examine the first visual content and determine that this content has a reduced presentation priority, and change the computer presentation to improve the visibility of the second visual content. For example, the system can examine frames of the first visual content stream to determine that a displayed slide has not changed significantly for at least a threshold amount of time (e.g., determine that the next slide has not yet been displayed), thus reducing the presentation priority of the currently-displayed slide. In some examples, the system can determine that one of multiple frames of the first visual content has been displayed in the presentation area for at least a threshold amount of time. In some implementations, in response to a determination of such display and/or lack of significant change in the first visual content, the system can add second visual content to the computer presentation, e.g., a video stream depicting a speaker displayed over a portion of the display of the first visual content or in a main view of the presentation, etc. For example, this can allow viewers of the presentation to view the speaker in a large display area after they have viewed the information of a slide for an amount of time without the speaker video obscuring any portions of the displayed slide.

Furthermore, the system can continue examining the first visual content to determine if the presentation priority of the first visual content increases. Such an increase in presentation priority can cause the system to improve (e.g., increase) the visibility of the first display content, e.g., by removing or reducing the size of the display of the second visual content and/or increasing the size of the first visual content. For example, the system can detect that a new slide is displayed in the first visual content (or some other change in pixel values occurs in the first visual content), which can indicate an increase in the presentation priority of the first visual content. The system can automatically remove the speaker video window from the computer presentation or can decrease the size of the speaker video window relative to its previous size. This can provide the new slide with visual importance.

One or more features described herein allow visual presentations to be provided more effectively. For example, a computer presentation can display particular content in a large size (e.g., full screen or in a large window) and can also display additional content, such as video showing a speaker, in a large size when appropriate. These features can provide clear display of information to viewers, e.g., on a single display. Furthermore, in some implementations, the system may not have to crop portions of the content or shrink the displayed size of content when the content is the focus of the presentation, providing greater clarity to viewers.

Such presentation can be assisted by the system automatically determining presentation priorities of various content, e.g., whether it is appropriate to display the additional content or whether the focus of the presentation should remain on the particular content. For example, the system can examine how long the particular content has been displayed in the presentation and whether sufficient change has occurred in the content to provide focus on that content or to allow display or emphasis of the additional content in the presentation. Features can allow the system to automatically determine when a focus of the presentation should be returned to the particular content and removal or reduction in size of the additional content in the presentation is appropriate. Features described herein can thus help improve the effectiveness of displayed computer presentations without requiring manual actions or intervention to adjust the display of content. Consequently, a technical effect of one or more described implementations is that computer presentation of content may be made more effective with reduced time and resources expended.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other and/or with server system 102 via network 130. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, such as a computer system, laptop computer, portable device, cell phone, smart phone, tablet computer, television, TV set top box or entertainment device, personal digital assistant (PDA), media player, wearable device (e.g., goggles or glasses, watch, armband, headset, jewelry, etc.), game device, etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service, implemented on server system 102. For example, respective client devices 120, 122, 124, and 126 may transmit communications and data to one or more server systems such as system 102. In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. A network service implemented by server system 102 can include a system allowing users to perform a variety of communications, form links and associations, upload and post shared content such as images, text, video, audio, and other types of content, and/or perform other socially-related functions. For example, users can participate in computer presentations by viewing content streamed to their client devices originating from a different client device via a server and/or network service, or originating from a server system and/or network service. In some implementations, a "user" can include one or more programs or virtual entities, as well as persons that interface with the system or network.

A user interface can enable display of images, video, data, and other content as well as communications, privacy settings, notifications, and other data on a client device 120, 122, 124, and 126. Such an interface can be displayed using software on the client device and/or a combination of client software and server software executing on the server system 102, e.g., application software or client software in communication with the server system. The user interface can be displayed on an output device of a client device, such as a display screen.

In some implementations, server system 102 and/or one or more client devices 120-126 can provide a presentation display application, e.g., included in a communication application, provided as a video display application, or other application. The presentation display application may allow a system (e.g., client device or server system) to display visual content in presentations, some examples of which are described herein. The display application can provide an associated user interface that is displayed on a display of the server system or client device. The user interface may provide various options to a user to select display modes, display window sizes, audio output selections, etc.

Other implementations can use any type of system and service. For example, any type of electronic device can make use of features described herein. Some implementations can provide features described herein on client or server systems disconnected from or intermittently connected to computer networks. In some examples, a client device having a display screen (or other display device) can display images and provide features and results as described herein that are viewable to a user.

Figure 2:
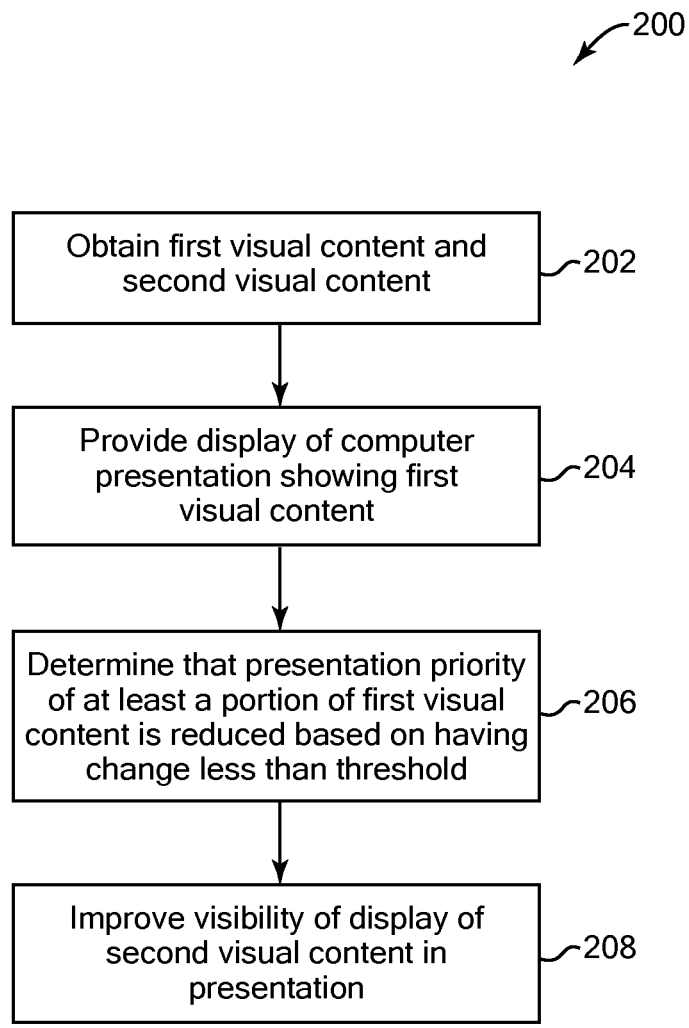
FIG. 2 is a flow diagram illustrating an example method to determine priority and visibility of displayed content in computer presentations, according to some implementations.

FIG. 2 is a flow diagram illustrating an example method 200 to determine priority and visibility of displayed content in computer presentations. In some implementations, method 200 can be implemented, for example, on a server system 102 as shown in FIG. 1. In some implementations, some or all of the method 200 can be implemented on a system such as one or more client devices 120, 122, 124, or 126 as shown in FIG. 1, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200.

A computer presentation, as referred to herein, can include computer display output displayed by a display device (e.g., display screen, projector, wearable display etc.) of a system (e.g., computer system, mobile device, laptop, cell phone, tablet computer, etc.). A computer presentation has a displayed presentation area that can include many different forms of displayed visual content, including text, symbols, images, figures, animations, video, patterns, colors, etc., and/or a combination of these. Each visual content can be displayed in the presentation area of the computer presentation having its own display area, e.g., an area in the presentation area covered by the visual content. For example, the presentation area can include one or more streams of video content, e.g., where each stream of video content can be displayed in its own display area, e.g., a window or other defined area. For example, each video stream can include a plurality of frames to be displayed in succession, where each frame is composed of multiple pixels (e.g., each frame can be an image in some implementations). A computer presentation and visual content data can be stored on one or more storage devices of the system or otherwise accessible to the system, such as a connected storage device, e.g., a local storage device or storage device connected over a network. In various implementations, the visual content data can be obtained from a variety of sources, e.g., memory, a database or archive accessed by the implementing system locally in the system or remotely over one or more networks, an album or other stored collection owned by a user, data uploaded by a user to a server over one or more networks, etc.

In block 202 of method 200, the method obtains first visual content and second visual content. For example, in some implementations the second visual content can be associated with the first visual content. In some implementations, the first visual content and/or second visual content can be any of various forms of content, e.g., one or more images, one or more documents, pages, spreadsheets, or other visual information, an animation sequence, a video, one or more pages or sections of text, a combination of various types of content (images, text, video, etc.), etc. For example, in some implementations, the first visual content and second visual content can be data streams each having a plurality of frames (or other images) displayed in succession. In some examples, the first visual content can be a video stream or image stream providing information (e.g., multiple successive slides or images), animation, or other content. The second visual content can include a video stream depicting a speaker, narrator, or other user that is providing speech, e.g., commentary related to the first visual content. Audio data corresponding to the first and/or second visual content can be stored or encoded in the first and/or second visual content or can be stored and/or provided separately from the corresponding content. For example, the audio data can encode the verbal speech (e.g., verbal commentary) provided by a speaker depicted in the video stream of the second visual content. Some examples are described below with reference to FIGS. 6-14. In various implementations, the first visual content and second visual content can be obtained from various sources (e.g., obtained from different sources or both obtained from same source), such as one or more storage devices, communication channels (networks, wireless broadcast, etc.), cameras or other recording devices, etc. In some implementations, the first visual content displayed in the presentation can be a shared screen image, video, animation, or other content from a system that is participating in (e.g., sending or receiving) the computer presentation. For example, the content can be provided from a client device participating in a video conference, video/text/audio chat, or other type of communication that displays the computer presentation to its participating systems. In some implementations, multiple participating client devices can each provide a different portion of the displayed first visual content. Similarly, the second visual content can be provided from one or more systems participating in the presentation. In some implementations, first visual content and/or second visual content can be received by the implementing system from a server device, e.g., server system 102 of FIG. 1. For example, the first visual content can be provided as one or more documents, spreadsheets, slide presentation documents, or other data presentations.

In block 204, the method provides or causes a display of a computer presentation to include the first visual content. For example, in some implementations the computer presentation can be provided in a presentation window or other presentation area on a display device (e.g., display screen or projector), where the presentation area can fill the entire display area of the display device or a portion of the display area of the display device. The computer presentation can include the first visual content displayed in its presentation area. For example, the first visual content can fill the entire presentation area. In some implementations, the first visual content can be displayed in a portion of the presentation area that is less than the entire presentation area.

In some implementations, the first visual content is displayed in the computer presentation in block 204 as having the highest presentation priority in the computer presentation than other visual content. For example, the first visual content can be considered the focus or primary subject of the computer presentation. Accordingly, in such implementations, the second visual content can have a lower presentation priority, e.g., the second visual content is not the focus or primary subject of the computer presentation. For example, the display of the second visual content can be omitted from the computer presentation at this stage of the method in block 204. In other implementations, block 204 can display the second visual content in the presentation area as lower or secondary presentation priority, e.g., a secondary subject of the presentation. For example, the second visual content can be displayed within the presentation area having a smaller-sized display area than the first visual content. In various implementations, the second visual content can be displayed to the side of the first visual content, overlapped by a portion of the first visual content, overlapping a portion of the first visual content, etc.

In block 206, the method determines that a first presentation priority of at least a portion of the first visual content is reduced. In some implementations, such reduction can indicate, for example, that the first visual content is no longer the focus or primary subject of the computer presentation (e.g., has a reduced presentation importance). In some implementations, the method determines that the first presentation priority of the first visual content (or portion thereof) is reduced relative to a second presentation priority of the second visual content. In some implementations, block 206 compares the first presentation priority of the first visual content to a second presentation priority of the second visual content, and determines that the first presentation priority is less than the second presentation priority (e.g., thus determining that the first visual content is no longer the focus or primary subject of the computer presentation). In some implementations, a reduction in the presentation priority of the first visual content can additionally or alternatively be considered an increase in a presentation priority of the second visual content.

In some implementations, the method determines the reduction in the first presentation priority based at least in part on an examination of the first visual content. For example, the method can determine how much of the first visual content has changed in amount of pixels and/or in change in pixel values such as color or brightness. In some implementations, a lack (or low amount) of change in the display of the first visual content (or a portion thereof) can indicate that the first visual content is approximately static, causing a reduction in the presentation priority of the first visual content (or portion thereof). For example, the method can determine whether the first visual content has had less change than a threshold amount of change. In some implementations, the method can determine how much of the first visual content has changed over a period of time, e.g., whether the first visual content has had less than a threshold amount of change for at least a threshold period of time. In some implementations, if the first visual content includes a plurality of frames to be displayed in sequence, the method can determine that one of the frames of the first visual content has been displayed in the presentation area for at least a threshold amount of time. Some implementations of determining the reduction in the first presentation priority of the first visual content are described below with reference to FIGS. 4 and 5. In some implementations, a second presentation priority of the second visual content is increased in response to the reduction of the presentation priority of the first visual content.

In some implementations, the method can receive directly signals or information (e.g., derived from or based on one or more sensors, user-controlled signalling devices, etc.) indicating whether the first visual content has changed by a threshold amount or more. For example, such information can indicate whether a command was received to advance a particular slide of the first visual content to a next slide of the first visual content in a sequence of slides. In some of these implementations, the method can directly check whether such information has been received and can determine to reduce the presentation priority of the first visual content without performing an examination of the first visual content. For example, if the first visual content includes a plurality of frames displayed in sequence, the method can determine that one of the frames of the first visual content has been displayed in the presentation area for at least a threshold amount of time, by, e.g., determining that a command has not been received to advance the display of the first visual content to a next frame for the threshold amount of time.

In some implementations, changes (if any) in the second visual content can be ignored in block 206, such that only a change in presentation priority of the first visual content is examined. In some implementations, a change (if any) in the second visual content can be examined in addition to change in the first visual content. In these implementations, the amount of change in the first visual content and the second visual content can be compared to determine whether the first presentation priority has decreased. Such implementations may be appropriate, for example, if the first visual content and second visual content are similar in type or presentation, e.g., both being video streams with a lot of motion or other changes, both being slide presentations having fewer changes over time, etc. For example, a change in the first visual content can increase the first presentation priority by an amount that is proportional to the amount of change detected in the first visual content over time. Similarly, a change in the second visual content can increase the second presentation priority by an amount that is proportional to the amount of change detected in the second visual content over time. The first and second presentation priorities can be compared, and if the second presentation priority is better (e.g., higher) than the first presentation priority, the first presentation priority can be considered reduced relative to the second presentation priority. Similarly, if the first presentation priority is better (e.g., higher) than the second presentation priority (and was not higher previously), the first presentation priority can be considered increased relative to the second presentation priority.

Some implementations can divide the first visual content into multiple portions, where each portion (or some of the portions) can be assigned its own presentation priority. For example, if the visual content is a slide presentation stream, each sentence or bullet point text portion of a slide in the slide presentation can be considered a different portion (e.g., each portion defined based on the amount of non-text pixels surrounding each text portion), and each such portion can have its own presentation priority. Some implementations can compare the presentation priority of multiple portions of the first visual content to the presentation priority of the second visual content, to determine which first content portions have a lower presentation priority than the second visual content. In some implementations, the second visual content can be provided improved visibility (described below) if displayed in positions of the computer presentation corresponding to these lower-priority first visual content portions. In some implementations, an increase or decrease in individual presentation priorities of particular portions of the first visual content can be determined based on similar criteria as described herein. For example, a user pointer (or other indication of user/speaker attention or focus) that references a particular portion of the first visual content can increase the priority of that portion and/or can decrease the priority of non-referenced portions of the first visual content, some examples of which are described below with reference to FIG. 5.

In block 208, the method improves (e.g., increases) a visibility of a display of the second visual content in the computer presentation. This block can be performed in response to determining that the first presentation priority of the first visual content is reduced, as in block 206. The improvement in visibility for the second visual content can be performed in a variety of different implementations.

In some implementations, the second visual content may not be displayed in the computer presentation prior to block 208 (e.g., and not displayed by the display device), such that only the first visual content was displayed in the computer presentation in block 204. In some of these implementations, block 208 can initiate the display the second visual content within the computer presentation, thus improving the visibility of the second visual content from none to some visibility in the presentation. In some implementations, the second visual content may have been displayed in the computer presentation prior to block 208. In some of these implementations, block 208 can cause the second visual content to improve in visibility compared to its display prior to block 208.

In some implementations, the second visual content can be improved in visibility by being displayed with a greater display size than its size prior to block 208. For example, if the second visual content was not displayed in the computer presentation before block 208, then by displaying the second visual content in block 208, it will be a larger display size than its previous display size of zero. In implementations in which the second visual content was displayed in the computer presentation prior to block 208, the second visual content can be displayed in a size larger than its previous displayed size. For example, the second visual content may have been displayed in a window in the computer presentation, e.g., to one side of the first visual content, adjacent to, overlapping, or being overlapped by the first visual content, etc. In block 208, the second visual content can be displayed in a size larger than such previous display.

In some implementations, the second visual content can be improved in visibility by being displayed in at least a portion of the presentation area of the computer presentation that displayed the first visual content prior to block 208. For example, if the second visual content was not displayed in the computer presentation before block 208, it can now be displayed at least partially overlapping the display of the first visual content. If the second visual content was displayed in the computer presentation before block 208, then this second content can be changed so as to overlap the first visual content at least partially (if it did not overlap previously), or to overlap the first visual content to a greater extent (if it did overlap previously). In some implementations, previously to block 208, the second visual content may have been displayed in a secondary, smaller window or view relative to the first visual content being displayed in a larger, main window or view of the computer presentation. These positions and/or sizes of the first and second visual content can be swapped in block 208 such that the second visual content is displayed in the main view and the first visual content is displayed in the secondary, smaller view.

In some implementations, the second visual content can be improved in visibility by changing the position of the display of the second visual content in the computer presentation in block 208. For example, the position can be changed to a more prominent or noticeable position, e.g., near the center of the presentation area or near some other highlighted position in the presentation area. In some examples, the display of the second visual content can be changed from a position adjacent to the first visual content display to a position overlapping the first visual content display, from a position closer to a border of the computer presentation to a position closer to a center of the computer presentation, etc.

In some implementations, the second visual content can be improved in visibility by changing one or more display characteristics of the second visual content. For example, the second visual content, or a portion thereof, can be displayed in a different brightness, contrast, or color (e.g., higher or lower depending on background brightness or color), with a flashing border or other patterned border (e.g., dashed line, etc.), with highlighted portions or objects, with an animated moving portion, etc. In some implementations, the second visual content can be improved in visibility by zooming in on the second visual content, by changing aspect ratio of the content, or by changing a display resolution of the content, etc. In some implementations, the second visual content can be improved in visibility by changing the opacity or transparency of the second visual content, e.g., increasing its opacity and/or decreasing its transparency. For example, the second visual content may have been previously displayed in the computer presentation with a particular transparency such that other content (e.g., a portion of the first visual content) that is positioned at the same position as the second visual content is partially displayed "through" the second visual content. In block 208, such a transparency can be reduced to cause the second visual content to appear more solid in its display such that other content at the same position is less visible through the second visual content.

Some implementations can change multiple characteristics of the second visual content to improve the visibility of the display of the second visual content. For example, the display of the second visual content can be both increased in size and can be displayed in at least a portion of the presentation area that previously displayed the first visual content. Various example implementations are also described below with reference to FIGS. 4-14.

The result of block 208 can provide any of various display configurations or formats for the first visual content and the second visual content. In some examples, the first visual content can be displayed to fill the entire presentation area (which can be the entire display area of a display device, in some implementations) and the second visual content can be displayed overlapping or overlaid on the first visual content (e.g., obscuring a portion of the first visual content). In some implementations, the first visual content can be displayed in a portion of the presentation area that is less than the entire presentation area, and the second visual content can be displayed in a different portion of the presentation area, e.g., adjacent to the first visual content, to one side of the first visual content, or otherwise within the presentation area. In some implementations, the second visual content can be displayed to fill the entire presentation area (which can be the entire display area of a display device, in some implementations) and the first visual content can be displayed overlapping or overlaid on the second visual content (e.g., obscuring a portion of the second visual content). Some implementations can provide individual presentation priorities of portions of the first visual content which can control or influence positions in the presentation area where the second visual content can be displayed relative to the portions of the first visual content.

Figure 3:
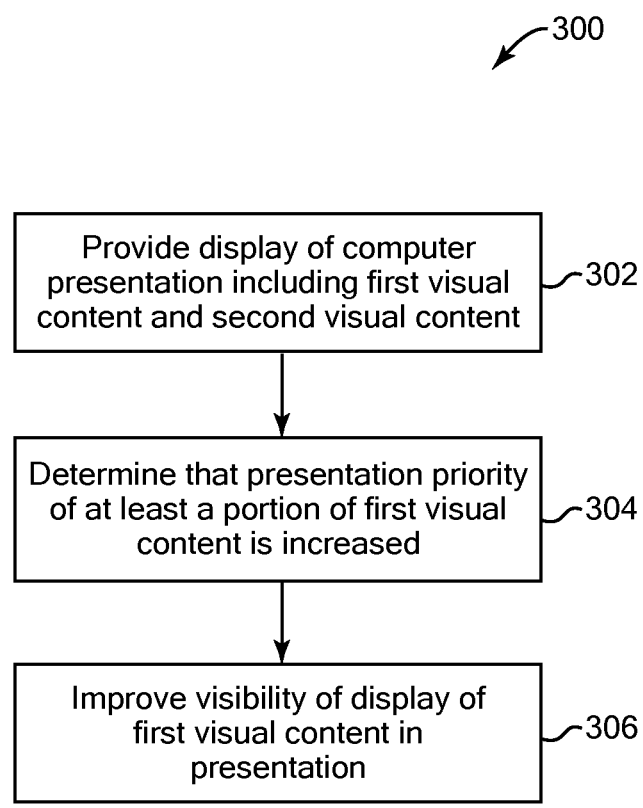
FIG. 3 is a flow diagram illustrating another example method to determine priority and visibility of displayed content in computer presentations, according to some implementations.

FIG. 3 is a flow diagram illustrating another example method 300 to determine priority and visibility of displayed content in computer presentations. Method 300 can be implemented, for example, on one or more systems and devices similarly as described above for method 200 of FIG. 2. In some implementations, method 300 can, for example, be performed after second visual content has been improved in visibility in a displayed computer presentation as described above with reference to block 208 of method 200 in FIG. 2. In some implementations, method 300 can be performed for a computer presentation that includes displayed first and second visual content, or can performed for computer presentations in other states or stages.

In block 302, the method provides a display of a computer presentation including first visual content and second visual content. For example, in some implementations the first and second visual content can be obtained and the computer presentation can be displayed in a presentation area on a display device similarly as described above in method 200. The computer presentation can include the first visual content and second visual content in the presentation display area. Various implementations can display the first visual content and second visual content in different configurations, sizes, and layouts. In some examples, similarly as described above, the first visual content can be displayed to fill the entire presentation area (which can be the entire display area of a display device, in some implementations) and the second visual content can be displayed overlapping or overlaid on the first visual content (e.g., obscuring a portion of the first visual content). In some implementations, the first visual content can be displayed in a portion of the presentation area that is less than the entire presentation area, and the second visual content can be displayed in a different portion of the presentation area, e.g., adjacent or to one side of the first visual content, overlapped by the first visual content, or otherwise within the presentation area.

In block 304, the method determines that the presentation priority of at least a portion of the first visual content is increased. In some implementations, such an increase can indicate, for example, that the first visual content has become a focus or primary subject of the computer presentation (e.g., has obtained greater presentation importance). In some implementations, the method can determine that the presentation priority of the first visual content (or portion thereof) is increased relative to a presentation priority of the second visual content. In some implementations, a reduction in the presentation priority of the second visual content can additionally or alternatively be considered an increase in a presentation priority of the first visual content.

In some implementations, the method determines the increase in presentation priority based on an examination of the first visual content. For example, the method can determine how much of the first visual content has changed over a period of time similarly as for block 206 of FIG. 2, e.g., by examination of pixels of the first visual content. A change (e.g., greater than a threshold amount of change) in the first visual content (or a portion thereof) can indicate that the content has changed, thus causing an increase in the presentation priority of the first visual content (or portion thereof). In some implementations, the method can receive directly a signal or information (e.g., derived from one or more sensors, user-controlled signalling devices, etc.) indicating that the first visual content has changed by a threshold amount or more, such that a visual examination of pixels of the first visual content may not be needed for the method to determine to increase the presentation priority of the first visual content. Some implementations of determining the increase in presentation priority of the first visual content are described below with reference to FIGS. 4 and 5. In some implementations, a presentation priority of the second visual content is decreased in response to the increase of the presentation priority of the first visual content.

In some implementations, changes in the second visual content can be ignored in this block, such that only a change in presentation priority of the first visual content is examined. In some implementations, a change (if any) in the second visual content can be examined in addition to change in the first visual content, and the changes in the first visual content and the second visual can be compared to determine whether the first presentation priority has increased, similarly as described above for block 208. Some implementations can determine an increase in presentation priority of a portion of the first visual content, similarly as described above for method 200.

In block 306, the method improves a visibility of a display of the first visual content in the computer presentation. For example, this block can be performed in response to determining that the first presentation priority of the first visual content is increased as in block 304. The improvement in visibility for the first visual content can be performed in a variety of different implementations.

In some implementations, if method 300 follows method 200 in which the second visual content was improved in visibility, block 306 can return the display of the first visual content to a prior level of visibility before the second visual content was improved in visibility, e.g., prior to block 208 of method 200. For example, the second visual content can be removed from the computer presentation in block 306, or can be reduced in size, can be moved to a different, less visible position within the computer presentation (e.g., away from a center of the presentation and closer to a border of the presentation), and/or can be partially overlapped by the first visual content, etc. In addition or alternatively, the first visual content can be increased in size, can be moved to a more visible position (e.g., closer to a center of the presentation and further from a border of the presentation), can be displayed in at least a portion of the area of the computer presentation that displayed the second visual content prior to block 306 (e.g., displayed to overlap a portion or all of the display area of the second visual content), can be displayed to overlap a greater portion of the second visual content than prior to block 306, can be moved to a main view area of the presentation (e.g., with the second visual content being moved out of the main view area), can be changed in one or more display characteristics of the first visual content (e.g., the first visual content (or a portion thereof) displayed in a different color, brightness, and/or contrast, with a flashing border or other patterned border (e.g., dashed line, with a different zoom level, with different image resolution and/or aspect ratio, etc.), with highlighted portions or objects, with an animated moving portion, etc.), etc. Some implementations can provide multiple of these features to improve the visibility of the display of the first visual content.

The result of block 306 can provide any of various display configurations or formats for the first visual content and the second visual content. In some examples, the first visual content can be displayed to fill the entire presentation area (which can be the entire display area of a display device, in some implementations) and the second visual content can be removed from the computer presentation. The second visual content can alternatively be displayed overlapping or overlaid on the first visual content (e.g., in a smaller size than the result of block 208 described above), obscuring a portion of the first visual content. In some implementations, the first visual content can be displayed in a portion of the presentation area that is less than the entire presentation area, and the second visual content can be displayed in a different portion of the presentation area, e.g., adjacent, to one side, or otherwise within the presentation area. In some implementations, the first visual content can be displayed overlapping or overlaid on the second visual content (e.g., obscuring a portion of the second visual content). Some implementations can provide individual presentation priorities of portions of the first visual content which can control or influence the locations in the first visual content that the second visual content can be displayed.

Figure 4:
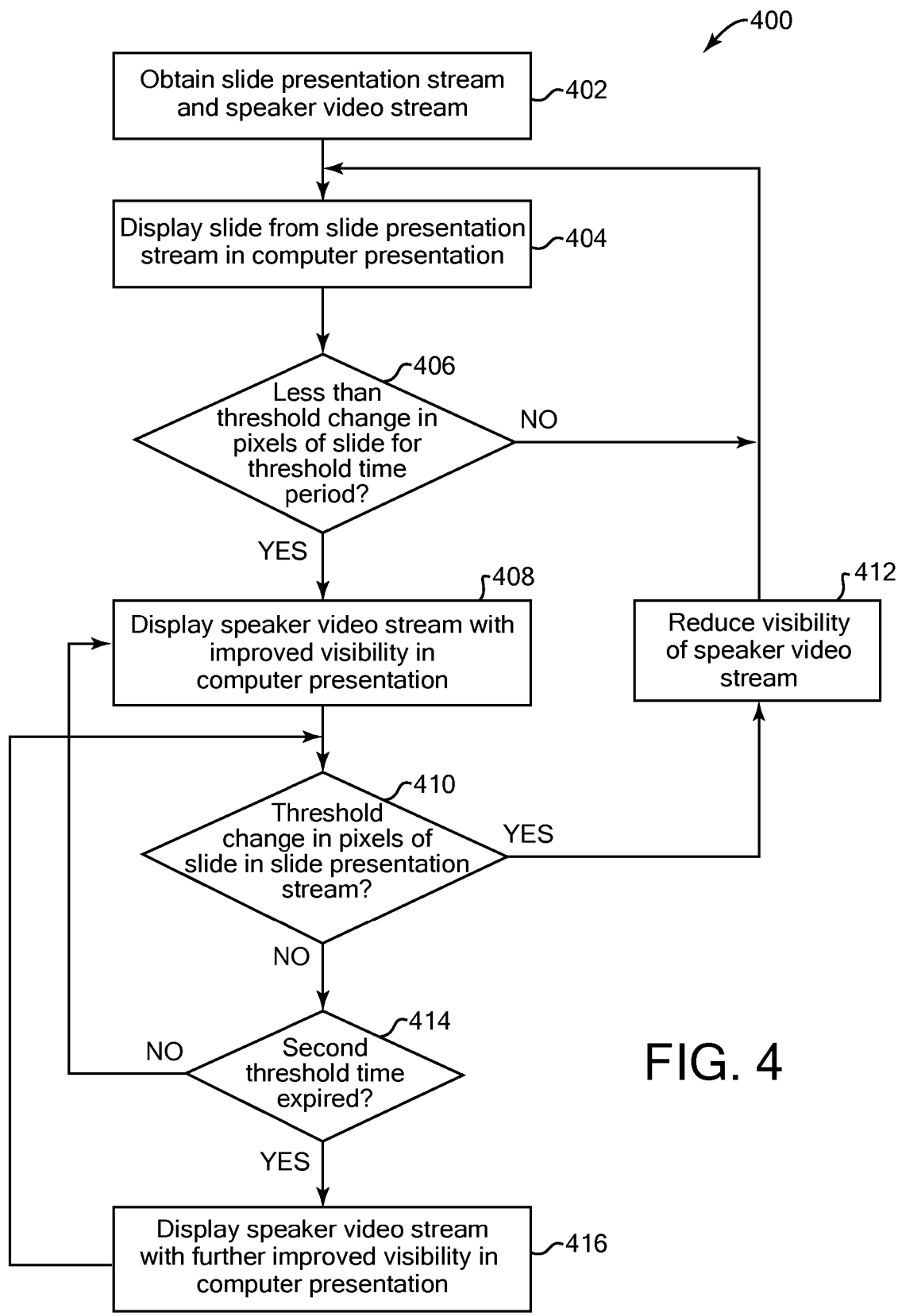
FIG. 4 is a flow diagram illustrating another example method to determine priority and visibility of displayed content in computer presentations, according to some implementations.

FIG. 4 is a flow diagram illustrating another example method 400 to determine priority and visibility of displayed content in computer presentations. Method 400 can be implemented, for example, on one or more systems and devices similarly as described above for method 200 of FIG. 2. In this example, the first visual content is a stream (e.g., sequence) of slides of information, and the second visual content is a video stream depicting a person (e.g., "speaker") commentating on the first visual content slides. In one example scenario, the computer presentation can be output in a video conference environment in which multiple users are viewing the presentation on their devices (e.g., client devices of FIG. 1) that are remotely connected via networks (e.g., network 130) and/or server(s) (e.g., server system 102). In another example scenario, the computer presentation can be output in a physical area such as a conference room, auditorium, or other area in which the speaker(s) and one or more viewers are physically present and viewing the presentation via one or more display screens and/or projections by one or more projectors (and/or to which remote devices can also connect via one or more networks). Other implementations can provide other forms of first visual content and second visual content as described in implementations herein.

In block 402, the method obtains a slide presentation stream as first visual content and obtains at least one speaker video stream as second visual content, where the speaker video stream depicts a speaker providing commentary for the slide presentation stream. For example, both streams can include multiple frames (images) displayed in sequence. For example, the slide presentation stream can be a video stream or image stream that includes a number of slide frames, where each slide frame is an image depicting one slide of the slide presentation. In some implementations, multiple frames of the slide presentation stream are identical, e.g., multiple frames depicting each slide. In some implementations, one frame of the slide presentation stream can be displayed as one slide and can continue to be displayed until a command to display the next slide of the slide presentation is received, at which point the next frame of the slide presentation stream can be displayed as the next slide. In some implementations, a single speaker video stream is received, while in other implementations, multiple streams of second visual content are received. For example, each speaker video stream can be a video stream showing a different person participating in or associated with the computer presentation. For example, one or more of the second visual content streams can be selected for display in the computer presentation when a second visual content stream is to be displayed in the computer presentation as described herein. In one example, a speaker video stream depicting the person who is currently talking or providing commentary about the presentation (e.g., the current or active speaker) can be selected for display when a second visual content stream is to be displayed in the computer presentation, such that the speaker and the second visual stream can change over time at different points in the presentation.

In block 404, the method displays (or causes to be displayed) a slide from the slide presentation stream in a presentation area of a computer presentation. For example, the slide can be a frame of the slide presentation stream provided for display by a display device as described above. In some implementations, a single slide can be displayed in the entire display area of the computer presentation, e.g., filling an entire display screen or projection area. In some implementations, the slide can continue to be displayed until a command is received to display the next slide in the slide presentation. Some implementations can omit the display of the speaker video stream in block 404, such that only the slide of the slide presentation stream is displayed in the computer presentation. In some implementations, the speaker video stream can also be displayed in the computer presentation in block 404. For example, the speaker video stream can be displayed having a reduced visibility compared to the slide, e.g., in a small size in a corner of the presentation display area, partially overlapped, etc.

In block 406, the method determines whether there has been less than a threshold amount of change in the pixels of the displayed slide for at least a threshold time period. The change threshold can be used to indicate that the slide has changed, e.g., to a next slide in the slide presentation stream. For example, in some implementations, the method can examine the slide presentation stream and compare the currently displayed frame of the stream (the current slide) to the last frame examined by the method (e.g., the previous displayed slide of the slide presentation stream). The method uses this comparison to determine whether the currently displayed frame of the stream has had less change in its pixel content relative to the previously displayed frame of the stream than the threshold amount of change. For example, the threshold amount of change can include a threshold number of pixels or percentage of pixels (of the entire slide) that provide an indication that a new slide has been displayed in place of a previous slide. In some implementations, the threshold amount of change can be defined as a threshold number of pixels that have changed in their pixel values (e.g., color or brightness) by a threshold value amount or more. In some implementations, the threshold number of pixels can vary based on image size (e.g., the larger the resolution of the image, the greater the threshold number of pixels). In some examples, the threshold change can be defined as a threshold percentage or ratio of pixels indicating the number of pixels that have changed in their values by a threshold value amount (or more) as compared to the total number of pixels in the slide presentation. In another example, the threshold change can indicate a number of "information pixels" that have changed in their pixel values by a threshold value amount, or a percentage or ratio of information pixels that have changed compared to total information pixels in the slide. The information pixels can be pixels that convey presentation information in the slide (e.g., pixels included in or part of text characters, symbols, figures, drawings, images, or other information), where non-information pixels can be pixels that are not included or part of such information (e.g., background pixels, "wallpaper" pixels, etc.).

In some implementations, various techniques for detecting changes in pixels in frames of a sequence can be used to determine the change in pixels. For example, in some implementations, motion detection techniques can be performed to identify changed pixels and/or to detect "motion" in pixels. In some examples, some motion detection techniques can determine whether pixel values (e.g., colors and/or brightnesses of pixels) have changed sufficiently to indicate motion of objects, motion of camera view, or other motion changes across multiple frames of a data stream e.g., a slide presentation stream, a speaker video stream, etc. For example, some motion detection techniques can detect whether a threshold number of pixels have changed in their pixels values as described herein. For example, some implementations can set one or more motion detection techniques to detect a predetermined threshold amount of motion in the first visual content, which can indicate the threshold amount of change in first visual content described herein. Other motion detection techniques can be used that detect whether the first visual content has changed.

The method can determine whether there has been less than the threshold amount of change in the slide pixels for at least a threshold time period. The threshold time period can be an amount of time that can be used to indicate that a particular slide has been displayed for a length of time sufficient to allow viewers of the computer presentation to have viewed the information of the slide or desired portions of the slide. For example, in some implementations the threshold time period can be a constant amount of time used for any slide, such as 20 seconds. In some implementations, the threshold time period can be a variable amount of time that can vary based on one or more conditions or characteristics of the currently-displayed slide and/or the computer presentation. For example, the threshold time period can be based on the amount of information displayed in the slide, e.g., the amount of text, symbols, figure area, time duration of video or animation, and/or other information displayed in the slide. In one example, based on the amount of information provided in the slide, the threshold time period can be adjusted for use in block 406 to check for pixel changes (e.g., the more words or characters, the greater area of the slide that is covered by diagrams or image objects, or the longer the animation or video displayed in the slide, the longer the threshold time period used in block 406). Such a variable threshold time period may provide, for example, a greater amount of time to viewers to read a larger amount of information in the slide in contrast to shorter amount of time allocated for a smaller amount of information in the slide.

In some examples, the visual examination of slides from the slide presentation stream can be performed by method 400 as a reliable and robust method to determine change in visual content. For example, method 400 may not be able to receive information from the system controlling the presentation that indicates that a user has commanded that the next slide be displayed. Furthermore, in some cases, different systems may use different types of commands from users or automated commands to instruct the display of next slides. By examining the frames of the slide presentation, the method can determine when a slide has changed for any of a variety of systems using a variety of different implementations. In other implementations, the method can directly receive information indicating that a next slide has been displayed in place of a previous slide (or has been commanded to be so displayed), such that the visual examination of pixels to determine the threshold change may not be needed.

If in block 406 a threshold change (or more) in pixels in the slide presentation stream is found to have occurred within the threshold time period, then the method can return to block 404 to display a slide in the slide presentation. For example, this change in pixels can indicate that a next slide of the slide presentation has been commanded to be displayed, e.g., by the speaker, other user, event (e.g., a slide presentation time has expired), or program (e.g., display program has commanded that a new slide be displayed), and indicates no reduction in presentation priority of the slide presentation stream. In various implementations, the command to cause the next slide to be displayed can be provided via a device (e.g., a user using a remote control or other input device providing an electronic signal to a device controlling the slide presentation display), via an audio command (e.g., a voice command from a user and recognized using voice recognition techniques), via a visual command (e.g., a gesture or other signature motion performed by the speaker in the speaker video stream (or other user) and detected and analyzed using image analysis techniques), via sensors detecting user motion or position (e.g., eye tracking, hand motion, etc.), or in other ways. In some implementations, slides may be configured to change to their next slides automatically, e.g., after a predetermined amount of time of display.

If less than the threshold change in pixels is determined in block 406 to have occurred for at least the threshold time period, then the slide can be considered to have a reduction in presentation priority. In block 408, the method displays (or causes display of) the speaker video stream in the computer presentation with improved (e.g., greater) visibility. For example, in implementations in which the speaker video stream was not displayed in the slide presentation in block 404 (e.g., prior to block 408), the speaker video stream can be displayed in the presentation area of the computer presentation. For example, in cases where the slide of the slide presentation stream is displayed over the entire presentation area, or is displayed in a main view or majority of the display area of the display device, the speaker video stream can be displayed at least partially overlaid on the slide presentation stream, e.g., covering a portion of the displayed slide. This allows the speaker video stream to be displayed in conjunction with the slide and allows both to be displayed in a large size relative to the available display area of the display device. In some implementations, the slide presentation stream can be reduced in size and the speaker presentation stream can be displayed alongside the slide.

In some implementations, the speaker presentation stream may have been displayed in the slide presentation stream prior to block 408, and visibility of the speaker video stream can be improved in block 408 in various ways. For example, some implementations can increase the size of the speaker video stream compared to its previous displayed size. For example, a smaller speaker video stream window previously displayed (e.g., in a corner over the display of the slide presentation stream) can be changed to a larger speaker video stream window and displayed in the presentation corner or in a more central location of the displayed presentation area. Some implementations can swap the positions of the slide presentation and the speaker video stream to improve the visibility of the speaker video stream. For example, if the slide presentation stream was displayed in a main view of the presentation and the speaker video stream displayed in a secondary, smaller view, then these streams can be swapped in the views in which they are presented. Some implementations can cause the speaker video stream to be emphasized or highlighted as compared to previous display of that stream before block 408. For example, the speaker video stream can be displayed with a different colored border, a color changed in a portion of the speaker video stream, etc.

In block 410, the method determines whether there is at least a threshold change in the pixels of the slide presentation. In some implementations, this change threshold can be the same as the change threshold used above for block 406. In some implementations, a different change threshold can be used to in block 410 as compared to the change threshold used in block 406. Some implementations can use a predetermined change threshold, and some implementations can use a dynamically-determined change threshold, e.g., based on the particular content of the slide presentation, other slide presentation characteristics, and/or other related characteristics (e.g., speaker characteristics, preferences of a controlling user, settings of a display application, etc.). In some implementations, block 410 need not consider a time period threshold, e.g., a threshold change in slide pixels over any time period can qualify for an affirmative result of block 410.

If in block 410 a threshold change in pixels in the slide presentation stream is determined to have occurred, then the slide presentation stream has changed and is considered to have had an increase in presentation priority. Thus, in block 412, the method reduces the visibility of the speaker video stream. For example, the threshold change can indicate that the displayed slide has changed to the next slide in the slide presentation, such that it may be useful to viewers of the presentation to view the entirety of the displayed next slide without any obstructions or distraction caused by improved-visibility display of the speaker video stream. Thus the method can reduce the visibility of the speaker video stream.

In some implementations, the reduction in visibility can include removing the speaker video stream from the presentation area and/or from the display area of the display device. Some implementations can decrease the display size of the speaker video stream, can move the speaker video stream to a different position within the slide presentation or display area (e.g., to a less prominent positions such as a corner of the presentation area), can swap the displayed positions of the speaker video stream and the slide presentation stream, and/or can overlap at least a portion of the speaker video stream with the slide presentation stream, etc. In some implementations, the reduction in visibility of the speaker video stream in block 412 can return the speaker video stream to the same visibility it was provided prior to any improvement in visibility of the speaker video stream in block 408, e.g., the same visibility as in block 404. In some implementations, the reduction in visibility in block 412 can result in a different display of the speaker video stream than in previous display (e.g., in block 404), e.g., a different size than previously used for the speaker video stream before any improvement in visibility. In some implementations, the method can return to block 404 after block 412 to continue display of the slide presentation with the new slide.

If in block 410, it is determined that a threshold change in pixels of the slide presentation stream has not occurred, then in some implementations (not shown), the method can return to block 408 to continue display of the speaker video stream in the slide presentation.

Some implementations can provide multiple improvements or reductions to the visibility of the speaker video stream and/or slide presentation stream. For example, if no threshold change in pixels of the slide presentation stream has been found in block 410, then the method can continue to block 414 in which the method determines whether a second threshold time period has expired without threshold change in the pixels of the slide presentation stream, e.g., where the second threshold time period is a time period since the last significant change in pixels was detected in the slide presentation stream. In various implementations, the second threshold time period can be a longer time period than the threshold time period used in block 406. For example, the second threshold time period can include the first time period examined in block 406 initially and can include an additional time period. In some implementations, the second threshold time period can be defined as an additional time period occurring after the first threshold time period of block 406.

If the second threshold time period has not expired, as determined in block 414, the method can return to block 408 to continue display of the speaker video stream in the slide presentation. If the second threshold time period has expired in block 414 with less than a threshold change in pixels of the slide, the method can continue to block 416, in which the method causes the speaker video stream to be displayed with further improved visibility in the presentation area, e.g., with greater visibility than the visibility provided in block 408. For example, if block 408 displayed the speaker video stream at a first size, block 416 can display the speaker video stream at a second size that is larger than the first size. In some implementations, if block 408 displayed the speaker video stream at a first position within the presentation area, block 416 can display the speaker video stream at a second position in the presentation area that is closer to a center of the presentation area. In some implementations, blocks 408 and 416 can provide different types of improved visibility in the display of the speaker video stream. For example, block 408 can display the speaker video stream at a larger size than in block 404 (or can display the speaker video stream initially after its omission in block 404), and block 416 can swap the display positions of the speaker video stream and the slide presentation stream such that the speaker video stream is positioned in a main view in the presentation area.

For example, a slide having less than the threshold change for the second threshold time period of block 414 can indicate that the speaker has been active (e.g., talking) for a longer time period without advancing the display to the next slide. This may indicate that viewers may value the speaker video stream more than the slide presentation stream, and the slide presentation stream can be further reduced in presentation priority and/or the speaker video stream can be further improved in visibility. In some implementations, further additional time thresholds and changes in visibility can be provided. For example, if the slide presentation stream has no threshold changes in pixels for a third threshold time period that extends beyond the second threshold time period, then the speaker video stream can be improved further in visibility and/or the slide presentation stream can be reduced in visibility in the presentation area. For example, the speaker video stream can be displayed to fill the entire presentation area and/or the slide presentation stream can be removed from the display of the presentation area.

In some implementations, after block 416, the method can return to block 410 to continue checking for threshold changes in pixels of the displayed slide presentation stream.

Figure 5:
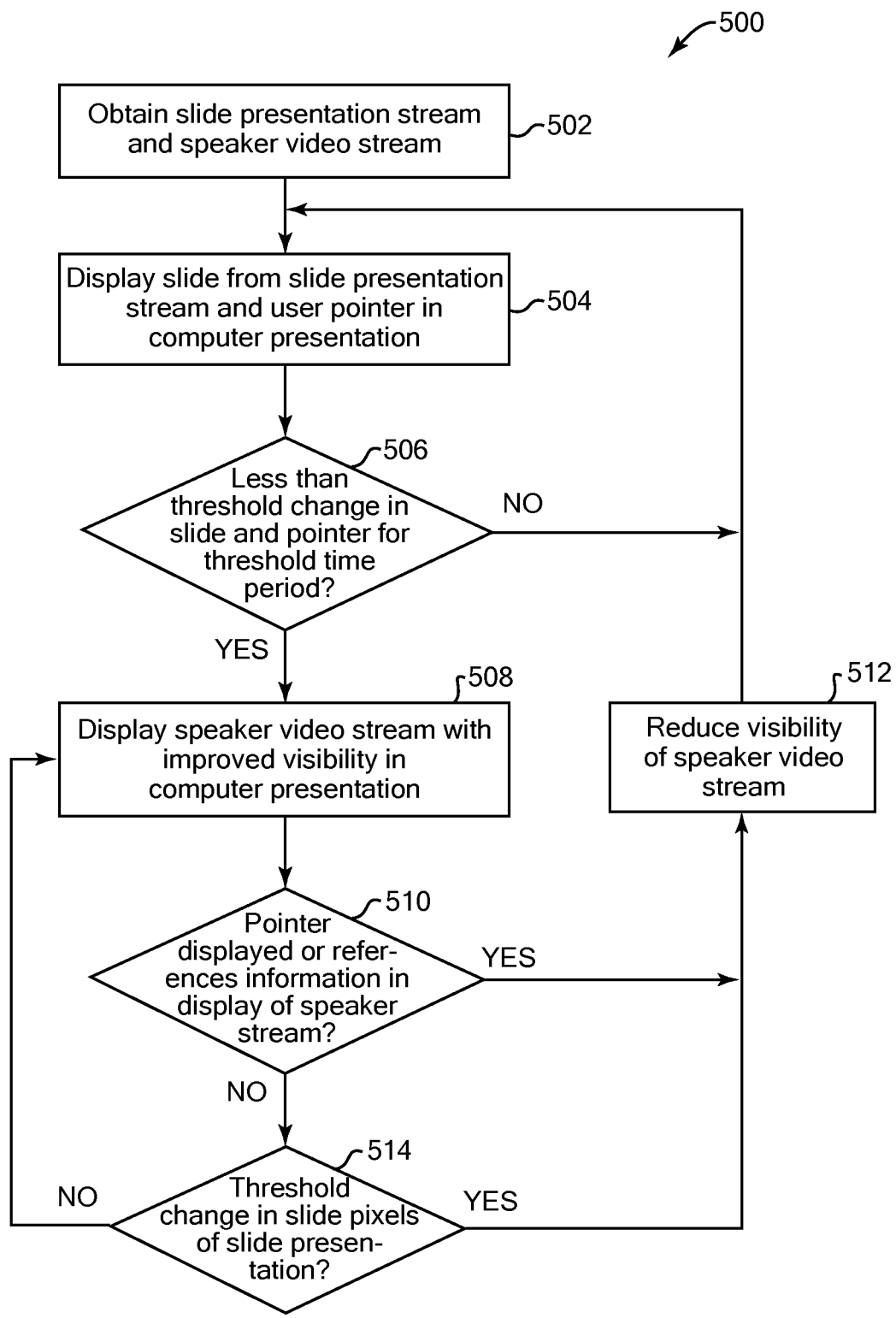
FIG. 5 is a flow diagram illustrating another example method to determine priority and visibility of displayed content in computer presentations, according to some implementations.

FIG. 5 is a flow diagram illustrating another example method 500 to determine priority and visibility of displayed content in computer presentations. Method 500 can be implemented, for example, on one or more systems and devices similarly as described above for method 200 of FIG. 2. In this example, the first video content is a stream (e.g., sequence) of slides, and the second visual content is a video stream depicting a person (e.g., "speaker") commentating on the first visual content slides and controlling a visual pointer pointing to or otherwise referencing a portion of a displayed slide.

In block 502, the method obtains a slide presentation stream as first visual content and obtains a speaker video stream depicting a speaker providing commentary for the slide presentation stream. For example, both streams can be video streams including multiple frames to be displayed in sequence. In some implementations, block 502 can be similar to block 402 described above.

In block 504, the method displays a slide from the slide presentation stream in a computer presentation. For example, the slide can be a frame of the stream provided for display by a display device as described above. In some implementations, a single slide can be displayed in the entire presentation area of the computer presentation and/or can fill the entire display area of a display device, e.g., an entire display screen or projection area. In some implementations, the slide can continue to be displayed until a command is received to display the next slide in the slide presentation. Some implementations can omit the display of the speaker video stream in block 504, such that only the slide is displayed. In some implementations, the speaker video stream can also be displayed in the computer presentation in block 504. For example, the speaker video stream can be displayed having a reduced visibility compared to the slide, e.g., in a small size in a corner of the presentation display area, partially overlapped, etc.

The method can also display (or cause to be displayed) a user pointer in the display area of the slide or elsewhere in the presentation area of the computer presentation. In some implementations, the user pointer can be displayed or caused to be displayed by a different method controlling the display of the slide presentation. The user pointer points to or otherwise references a portion of the first visual content, e.g., particular information of the displayed slide, such as a bullet point sentence, a paragraph, an image, a drawing, a symbol, etc. The user pointer can be displayed as any of a variety of different shapes or symbols in different implementations. For example, the pointer can be displayed as an arrow, circle, line, dot, icon or symbol, etc. The position of the user pointer in the presentation area can be based on user input. In some implementations, the speaker (or other person) can control the position of the pointer using an input device, e.g., a stylus on a tablet sensing device, a mouse, a trackball, a joystick, a touchscreen, etc. Some implementations can determine the pointer position based on voice commands from a user as recognized by a system using voice recognition techniques. Some implementations can determine the pointer position based on visual commands from the speaker detected in the speaker video stream and recognized by a system using image/video analysis techniques. For example, in some implementations, a system can determine the pointer's position based on recognizing the verbal commentary provided by the speaker using voice recognition techniques, and matching that commentary to a particular portion of the displayed slide. For example, if the system recognizes that the user is talking about a particular topic composed of certain words (e.g., recognized words that are not common words), the system can attempt to match those words or a phase including those words in the slide, and determine a location in the slide to which the speaker is referring and at which the pointer is displayed (e.g., the pointer can be displayed overlaid in the slide, on or to the side of a paragraph or sentence that includes the matched, recognized words). Some implementations can determine the pointer position based on other user input, e.g., user motion or position as detected by sensors connected to the system, e.g., user eye motion and position, finger motion or position, etc. Some implementations may combine two or more of the above techniques to determine the pointer position.

In block 506, the method determines whether there has been less than a threshold change in the pixels of the slide presentation stream, and less than a threshold position change in the user pointer position in the slide, for at least a threshold time period. For example, in some implementations, to detect the change in slide pixels, the method can examine the slide presentation stream and compare the currently displayed frame of the stream (the current slide) to the last frame examined by the method. The method may use this comparison to determine whether the currently displayed frame of the stream has had less change in its pixels than the threshold amount of change as compared to the previously displayed frame of the stream. For example, this can be performed similarly to the block 406 of FIG. 4, with a similar change threshold and threshold time period as described.

The method also determines whether the user pointer position has had a threshold change in position during the threshold time period. For example, the method can examine the pixels of the display to detect the current position of the user pointer (e.g., if the method 500 is itself not displaying the pointer, in which case it may know this position directly based on received user input controlling the user pointer). Detection of a threshold position change can be implemented in various ways. In some examples, the method can determine whether the user pointer has changed its position greater than a threshold distance in the presentation area (e.g., a threshold pixel distance). If the user pointer has moved greater than the threshold distance within the threshold time period, the user pointer can be considered to have had a threshold change in position. In some implementations, a threshold position change can be detected as a different portion of the slide now referenced by the user pointer as compared to a previous referenced portion of the slide. For example, if the pointer has advanced to a next or different bullet point sentence of the slide, then it can be considered a threshold change in position. In some implementations, the method can determine change in position of the user pointer to a different sentence or bullet point via text recognition techniques, e.g., recognizing bullet point symbols, whitespace indicating new paragraphs or lines of text, etc.

If there has been at least a threshold change in slide pixels or user pointer position, then the method can return to block 504 to continue display of the slide and the user pointer. For example, the threshold change in slide pixels can indicate that a next slide of the slide presentation has been commanded to be displayed as described above. A threshold position change in pointer position can indicate that the speaker may be discussing a different topic or information that is referred to by a different portion of the slide, and thus the attention of viewers may continue to be directed to the slide. Thus, in this case, the method does not display the speaker video stream with an improved visibility.

If there has been less than a threshold change in slide pixels and in user pointer position in block 506, then the method can continue to block 508, in which the method displays the speaker video stream with improved visibility in the computer presentation. In some implementations in which the speaker video stream was not displayed in the slide presentation in block 504 (e.g., prior to block 508), the speaker video stream can be displayed in the slide presentation, e.g., at any location not overlaying (covering) the user pointer and not overlaying any portion of the slide that is referenced by the user pointer. For example, if the user pointer is pointing to particular information in a portion of the slide (e.g., a sentence, paragraph, figure, or image displayed in the slide), the speaker video stream can be displayed in the slide so as not to cover or overlap that information. In some implementations, the slide of the slide presentation stream is displayed over the entire presentation area or is displayed in a main view or majority of the display area, and the speaker video stream can be displayed at least partially overlaid on the slide presentation stream, e.g., covering a portion of the displayed slide. In some implementations, the speaker presentation stream may have been displayed in the slide presentation stream prior to block 508, and the speaker video stream can be made more visible in block 508 in various ways similarly as described above in FIG. 4, e.g. in block 408. The improvement in visibility of the speaker video stream, for example, can include a larger size, change in position within the presentation area, etc., such that the speaker video stream does not cover or overlap the user pointer and does not cover the portion of the slide that is pointed to by the user pointer as described above.

In block 510, the method determines whether the user pointer is displayed in or references slide information included in the display area of the speaker video stream in the computer presentation. For example, the user pointer may have been moved to a new location in the presentation area of the computer presentation based on user input. In one example, the speaker may have moved the pointer to point to a different bullet point, paragraph, or other information included in the slide because the speaker wishes to comment on or describe that information. If the user pointer has been moved to a position at least partially covered by the display of the speaker video stream, or the user pointer references information that is at least partially covered by the display of the speaker video stream, it may be useful to reduce visibility of the speaker video stream to allow the pointer and/or referenced information to viewed without obstruction by the speaker video stream.

If it is determined in block 510 that the user pointer is displayed in or references slide information included in the display area of the speaker video stream in the computer presentation, the method can continue to block 512 and reduce the visibility of the speaker video stream. For example, the speaker video stream can be removed from the slide presentation and/or from the entire display area, can be moved away from the user pointer and its referenced information in the slide, can be decreased in display size so as to no longer obstruct the display of the user pointer or information pointed to by the user pointer, can be moved to a different position away from the center of the presentation, and/or can be swapped out of a main view of the presentation with the slide presentation stream, etc. In some implementations, the reduction in visibility of the speaker video stream in block 512 can return the speaker video stream to the same visibility it was provided prior to any improvement in visibility of the speaker video stream, e.g., the same visibility in block 504. Some implementations can reduce the visibility of the speaker video stream similarly as described above for block 412 of FIG. 4. In some implementations, the method can then return to block 504 to display the slide presentation stream and user pointer.

If it is determined in block 510 that the user pointer is not displayed in and does not reference slide information included in the display area of the speaker video stream in the computer presentation, the method can continue to block 514, where the method can determine whether there is a threshold change in the pixels of the slide presentation stream. In some implementations, the change threshold used in block 514 can be the same as the change threshold used above for block 506. In some implementations, a different change threshold can be used in block 514 as compared to the change threshold used in block 506. Some implementations can use a predetermined change threshold, and/or some implementations can use a dynamically-determined change threshold, e.g., similarly as described above for block 410 of FIG. 4. In some implementations, block 514 need not look at a time period threshold, e.g., a threshold change in slide pixels occurring over any time period can qualify for an affirmative result of block 514.

In some implementations, if the threshold change in pixels of the slide presentation stream has not occurred as determined in block 514, then the method can return to block 508 to continue displaying the speaker video stream in the slide presentation. If in block 514 a threshold change in pixels in the slide presentation stream is determined to have occurred, then the method can continue to block 512 to reduce the visibility of the speaker video stream in the slide presentation as described above (e.g., removed from the displayed presentation area, moved, swapped, etc.). For example, in some implementations the detected threshold change in pixels can indicate that a next slide of the slide presentation has been commanded to be displayed and the speaker video stream should be reduced in visibility. In some implementations, the method can then return to block 504 to display the slide in the computer presentation and a user pointer.

In some implementations, a user pointer is not displayed in the computer presentation, and the method 500 can determine that a particular portion of the slide is being referenced by a speaker or other user based on particular user input. In some examples, the method can use user positional input to determine a portion of the currently displayed slide that is being referenced by the speaker or other user, without the display of a user pointer in the computer presentation. For example, a user's touch input on a touchscreen or trackpad, or control of a mouse, joystick, trackball, or other input device can be sensed to determine a portion of the slide being referenced.

In some implementations, the method can use voice recognition techniques to analyze voice data derived from verbal commentary spoken by the speaker (and captured via one or more microphones) and determine recognized text (e.g., words or phrases) in the voice data. The method can compare the recognized text from the voice data to text displayed in the current slide of the slide presentation stream. If the recognized text matches particular displayed text in the slide (or is substantially similar to the displayed text, e.g., has a threshold number of words or portions of words the same as the displayed text within a predetermined amount of successive words), then the method can consider the matched text in the slide to be currently referenced by the speaker. For example, this can be treated as if the speaker had moved a displayed user pointer to that matched text. The presentation priorities and display of the slide presentation stream and speaker video stream can be determined based on the matched slide text being referenced similarly as with a user pointer as described above (e.g., no position of a user pointer itself need be checked in some implementations).

In some implementations, a speaker's (or other user's) eye movements or eye positions can be used to determine which portion of the slide is referenced by a speaker or other user and cause determination of presentation priorities and visibility of content similarly as described above with a user pointer. Eye trackers of any of variety of types can be used to provide the eye input. For example, optical sensors positioned near the speaker can sense the speaker's eye position and/or movements as the speaker is looking at the displayed slide presentation and can determine the approximate location of the slide at which the speaker is looking. In some examples, eye-attached sensors or user-attached sensors can be used. The method can associate the closest information in the slide to the determined eye location of the speaker, such that the information is referenced by the speaker similarly as if a user pointer referenced the information as described above. The presentation priorities and display of the slide presentation stream and speaker video stream can be determined based on user-referenced slide information similarly as when using a user pointer as described above.

FIGS. 6-14 are diagrammatic illustrations of example display interfaces showing example computer presentations illustrating one or more features described herein. Similarly labeled items across FIGS. 6-14 indicate similar parts and will not be described for each Figure.

Figure 6:
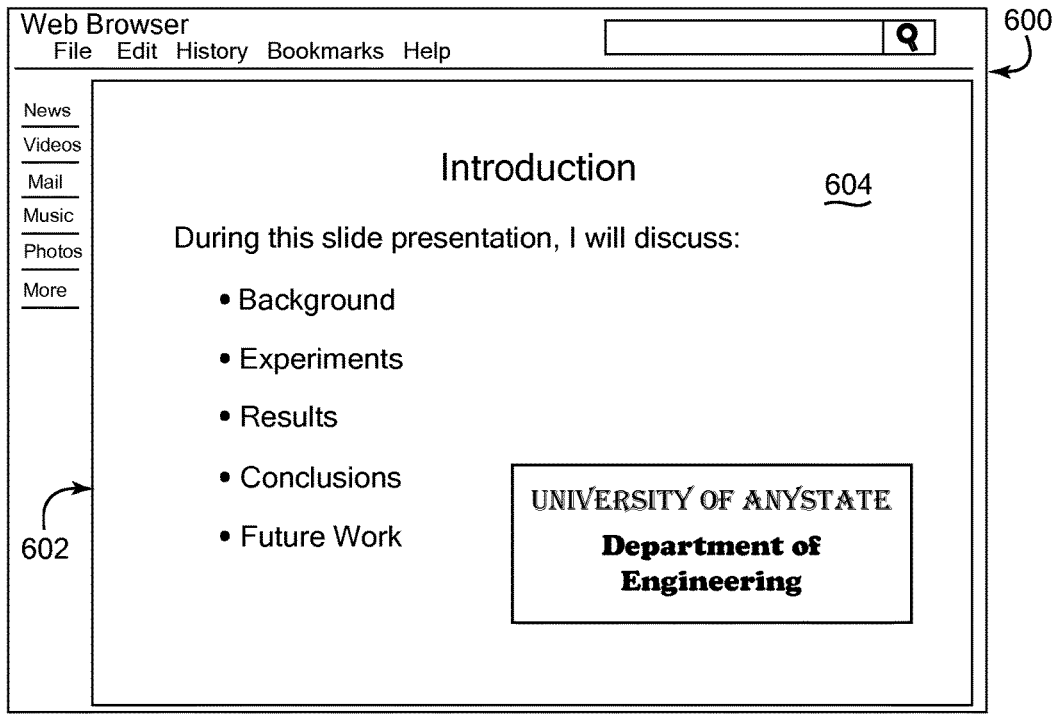
FIGS. 6-14 are diagrammatic illustrations of example display interfaces illustrating one or more features described herein.

FIG. 6 shows an example display interface 600 displayed by a display device of a system, e.g. a display screen, display projector, etc. Interface 600 displays a computer presentation 602. In this example, display interface 600 includes menu options, e.g., from an operating system or application program, and displays the computer presentation 602 within the interface 600. In other cases or implementations, the computer presentation can fill the entire interface 600 (e.g., interface 600 can fill the entire display area of the display device, such as a display screen or projector display area). In some implementations, the computer presentation 602 can be displayed by a single display device of a computer device. In some implementations, data of the computer presentation 602 can be transmitted over a network from a computer device such that the computer presentation 602 is displayed by display devices of one or more other computer devices, e.g., in a video conference environment.

Computer presentation 602 can be a displayed presentation including information or other output provided as text, images, video, graphics, animations, figures, etc. In this example, computer presentation 602 includes first visual content that is a slide presentation stream similarly as described above for FIG. 4. The slide presentation stream can present a single slide 604 at one time in the display interface 600, and can display other slides in place of slide 604 according to a sequence from the slide presentation stream. For example, the next slide in the slide presentation stream can be displayed in response to receiving an appropriate command from a user, by the system running and displaying interface 600.

Slide 604 can present one or more different types of information within the display area of the slide, including text, figures, images, animations, video, etc. In this example, slide 604 includes text information and graphical information (e.g., a logo or box). Furthermore, in this example, a user is associated with the slide presentation stream. The user is a speaker providing verbal commentary to accompany the displayed slides. For example, the speaker can be recorded by a video camera and included in a speaker video stream that is being received by the system displaying interface 600. In the example of FIG. 6, the speaker video stream is being received and is not currently being displayed in the presentation area of the computer presentation 602. An audio track providing the verbal commentary of the speaker and which is included in and/or accompanying the speaker video stream can be output in conjunction with the display of the computer presentation 602. In other implementations as described herein, the speaker video stream can also be displayed in computer presentation 602 at this stage.

Figure 7:
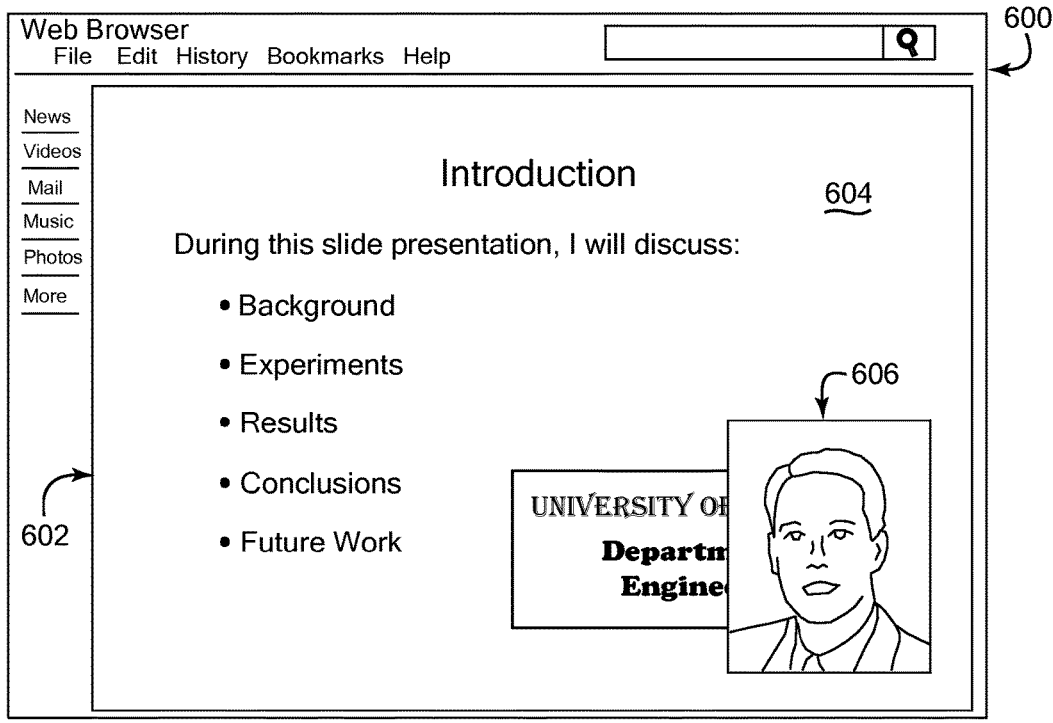

In FIG. 7, the system has determined that the slide 604 has been displayed in presentation 602 with less than a threshold change in its pixels for at least a threshold time period (e.g., a process running on the system may not have knowledge about user commands to change the slides, and so this process can examine the currently displayed slide of the slide presentation stream to determine whether slide changes have occurred). In some implementations, as described above, a threshold change can be at least a threshold number or percentage of pixels that have changed in value (e.g., color, brightness, etc.), e.g., by a threshold value amount.

Since the slide 604 has not changed by a threshold amount for a threshold time period, the system can consider the slide to have been displayed sufficiently long to reduce the presentation priority of the slide. The system can improve the visibility of the speaker video stream in the computer presentation. In this example, the speaker video stream is newly displayed in the computer presentation. For example, the system can display the speaker video stream 606 as a window that depicts the speaker. Speaker video stream 606 can display a continuous stream of frames depicting the speaker talking, making gestures, etc. For example, the speaker video stream 606 can be displayed in a corner of the presentation area of the computer presentation 602, overlaid on the displayed area of the slide 604. Other implementations can display the speaker video stream 606 and/or slide 604 in other ways, as described herein, e.g., in examples described with reference to FIGS. 9 and 10.

Figure 8:
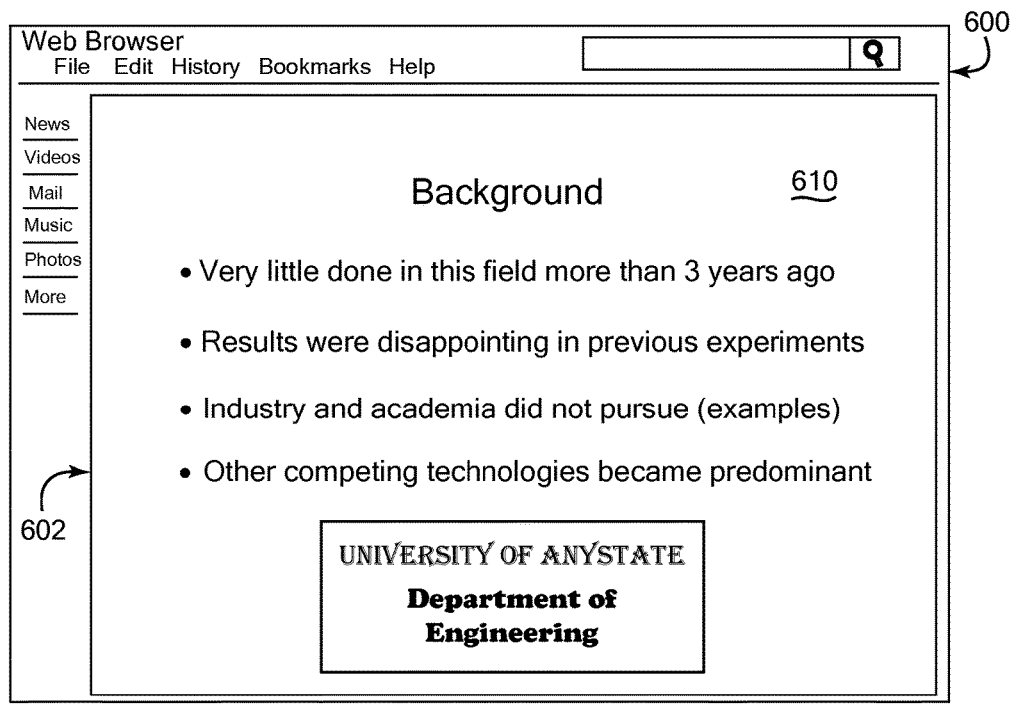

In FIG. 8, a next (different) slide 610 in the slide presentation stream is displayed in the computer presentation 602 e.g. in response to a user command. Slide 610 presents different information than the previous slide 604, e.g., different text in this example. The system has determined that a significant change in the pixel values of the displayed slide has occurred relative to the slide 604. The system may therefore determine that the slide presentation stream has an increased presentation priority and further, that the speaker video stream should be reduced in visibility. In this example, the system removes the speaker video stream from the presentation 602. Other implementations can reduce the size of the speaker video stream, increase the size of the slide presentation stream (if appropriate), etc.

Figure 9:
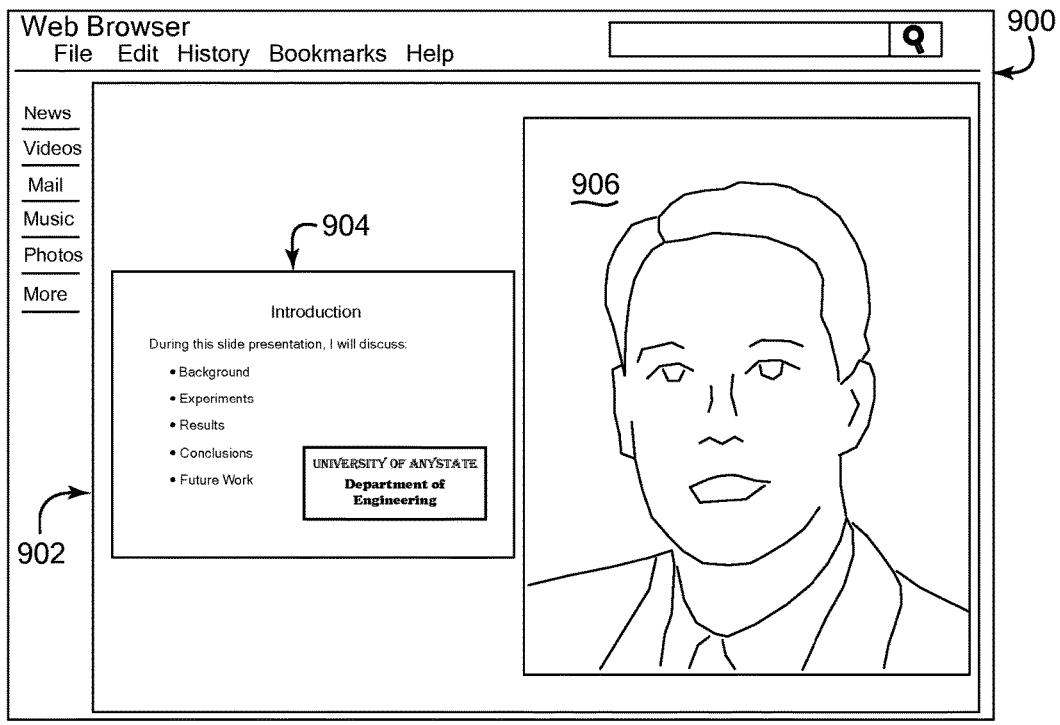

FIG. 9 shows an example display interface 900 displayed by a display device of a system, e.g., similar to interface 600 of FIG. 6. Interface 900 displays a computer presentation 902 and the system receives a slide presentation stream and speaker video stream similarly as described above for FIG. 6. In this example, the presentation 902 previously displayed only a slide from a slide presentation stream, similar to slide 604 as shown in FIG. 6. This slide was displayed without a threshold change in its pixels for a least a threshold time period, such that the speaker video stream 906 is now displayed. In this example, the system does not display the speaker video stream as a window 606 displayed in a corner of the slide presentation stream as shown in FIG. 7. Instead, in presentation 902, the size of the slide is reduced and reduced size slide 904 is displayed. In addition, presentation 902 displays the speaker video stream 906 alongside the slide 904, in a size larger than the slide 904. In some example implementations, the speaker video stream 906 may have been originally displayed similarly to speaker video stream 606 of FIG. 6 (e.g., of smaller size and positioned in a corner of the slide presentation stream), and then can be displayed as larger speaker video stream 906 for improved visibility if less than a threshold change was found in the displayed slide for the threshold time period. In some implementations, the slide can be increased back to the size shown in FIG. 6 and the speaker video stream can be removed from the presentation 902 if the displayed slide has at least a threshold change in pixels (e.g. when the displayed slide is changed to the next slide of the slide presentation stream).

Figure 10:
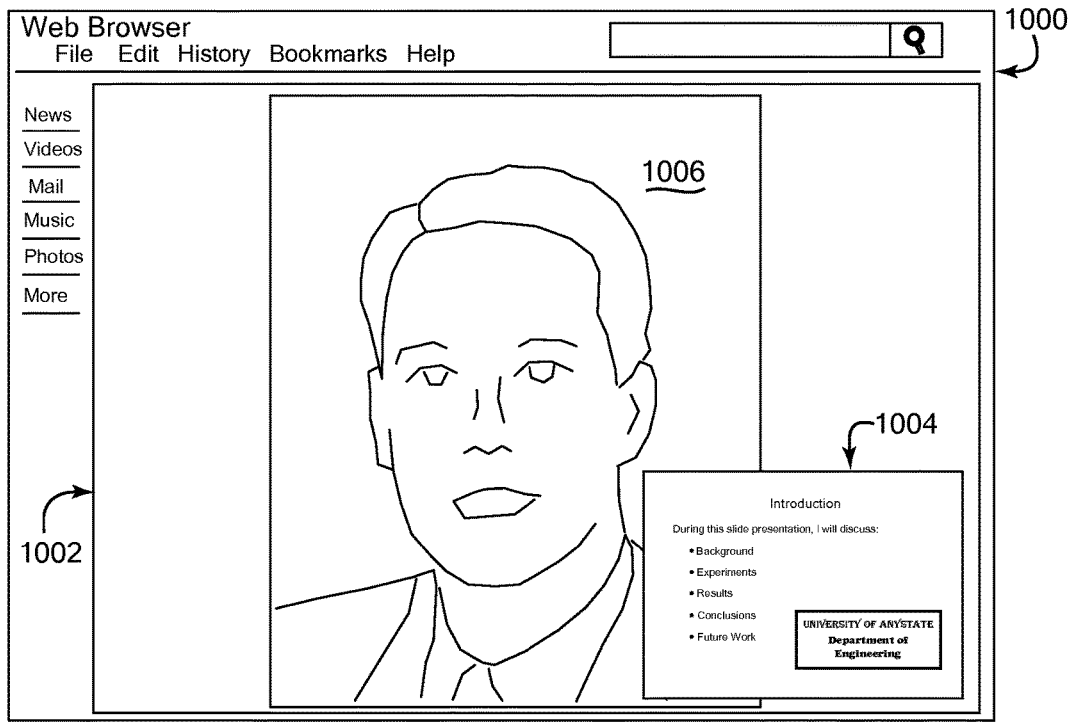

FIG. 10 shows an example display interface 1000 displayed by a display device of a system, e.g., similar to interface 600 of FIG. 6. Interface 1000 displays a computer presentation 1002 and the system receives a slide presentation stream and speaker video stream similarly as described above for FIG. 6. In this example, the presentation 1002 previously displayed a slide from a slide presentation stream in a main, larger view, and displayed a speaker video stream in a window in the corner of the slide and overlapping the slide, similarly to the presentation 602 as shown in FIG. 7. The system has determined that the slide was displayed without threshold change in its pixels for a least a threshold time period, such that the speaker video stream is now displayed with greater visibility. In this example, the system has swapped the slide and the speaker presentation stream such that the size of the slide is reduced and the size of the speaker video stream is increased. The example resulting presentation 1002 is shown in FIG. 10, with an increased-size speaker video stream 1006 displayed in a main view of the presentation 1002 and a reduced-size slide 1004 displayed in a corner and overlapping at least a portion of the speaker video stream 1006. In some implementations, the slide and speaker video stream can be swapped again to positions similar to FIG. 7 if the displayed slide is changed to the next slide of the slide presentation stream.

Figure 11:
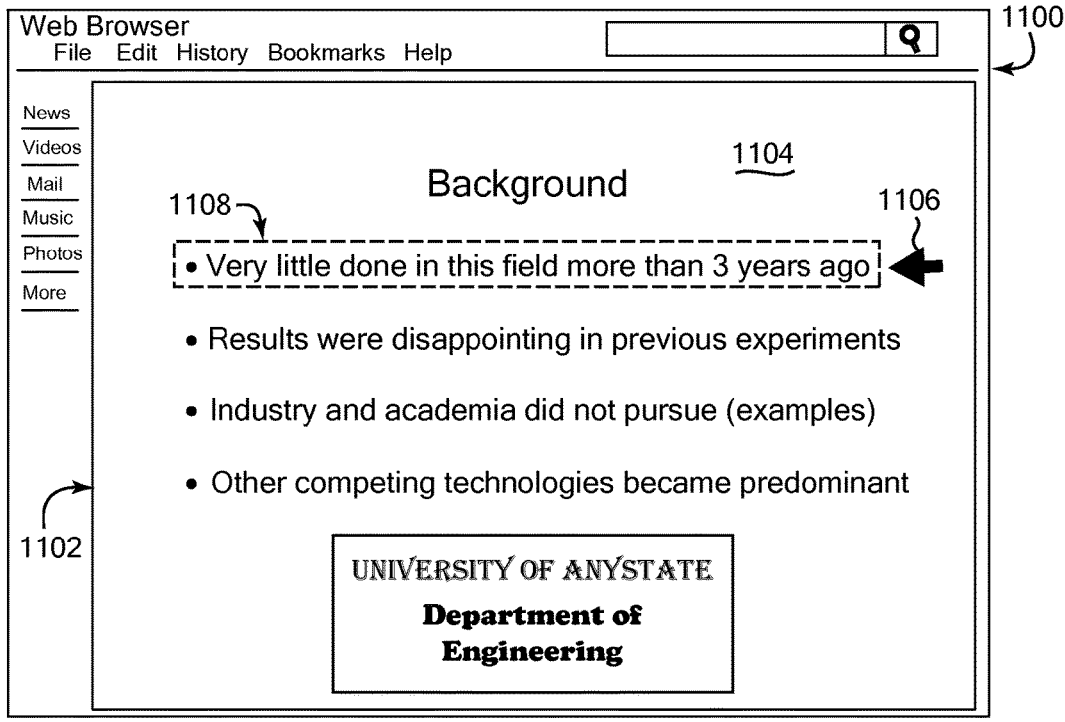

FIG. 11 shows an example display interface 1100 displayed by a display device of a system, e.g., similar to interface 600 of FIG. 6. The system receives a slide presentation stream and speaker video stream similarly as described above for FIG. 6. Interface 1100 displays a computer presentation 1102 including a slide 1104 from the slide presentation stream. In this example, the presentation 1102 also includes a user pointer 1106 that points to a particular portion of the slide 1104. For example, the user pointer 1106 points to the text portion 1108 indicated by the dashed box (the dashed box need not actually be displayed in the presentation), e.g., a sentence or line of text associated with a bullet point. In some implementations, the speaker (or other user) can provide user input to the displaying system via a control device, voice commands, visual commands, etc., which controls the position of the user pointer 1106 on the displayed slide 1104.

Figure 12:
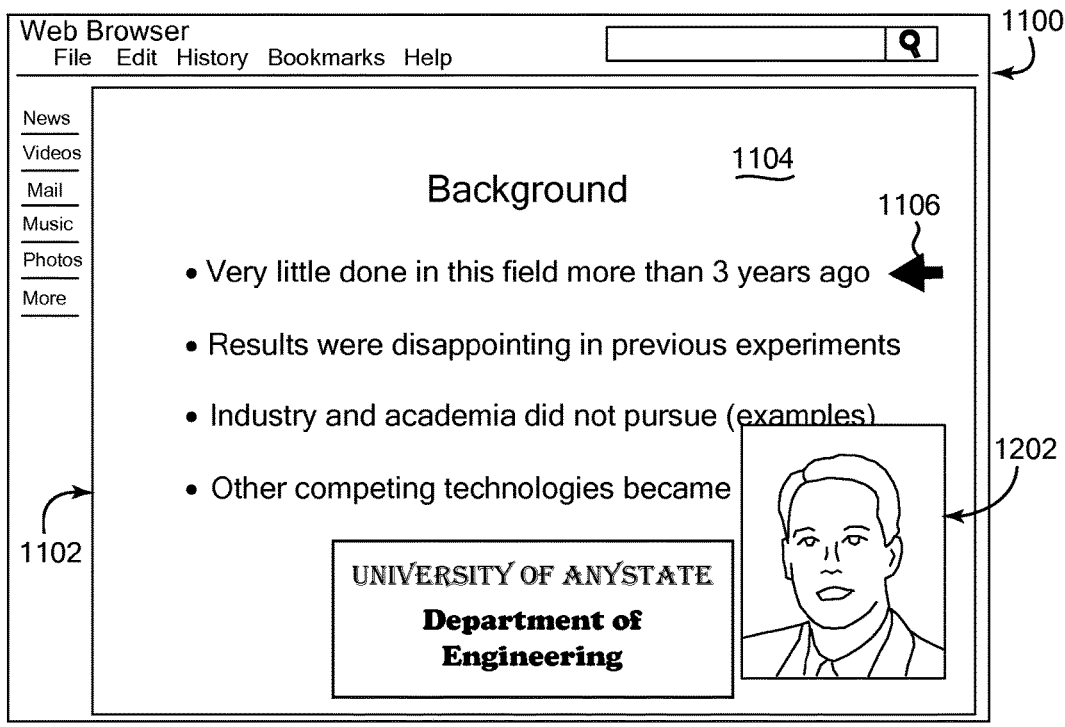

In FIG. 12, the system has determined that the slide 1104 has been displayed in presentation 1102 without any changes in its pixels for at least a threshold time period (e.g., a process running on the system may not have knowledge about user commands to change the slides, and so this process can examine the currently displayed slide of the slide presentation stream to determine whether slide changes have occurred). The system has also determined that the user pointer 1106 has not changed its position beyond a threshold distance from its previous position for the threshold period of time.

Since the slide 1104 and pointer 1106 have not changed for a threshold time period, the system considers the slide to have been reduced in presentation priority and improves the visibility of the speaker video stream in the computer presentation. In this example, the speaker video stream 1202 is newly displayed in the computer presentation as a window that depicts the speaker, e.g., in a corner of the presentation area of the computer presentation 1102 and overlaid on the displayed area of the slide 1104.

In some implementations, different portions of the slide 1104 can be considered to have their own independent presentation priorities. For example, a portion such as text portion 1108 that is pointed to by the user pointer 1106 can be considered to have a higher presentation priority relative to other portions of the slide, e.g., the other text portions associated with bullet points in slide 1104. Some implementations can consider the presentation priority of indicated text portion 1108 to be higher than the presentation priority of other visual content such as the speaker video stream 1202 and/or other portions of the slide 1104. In some implementations, the speaker video stream is displayed over the slide 1104 (or otherwise located in presentation 1102) at a location that does not overlay the portions of slide 1104 that have higher presentation priority than the speaker video stream. For example, the speaker video stream can be restricted in its display such that it does not overlay text portion 1108 and user pointer 1106, but can overlay the other portions of the slide 1104 which are considered to have a reduced presentation priority (e.g., a lower presentation priority than the speaker video stream in this example).

Figure 13:
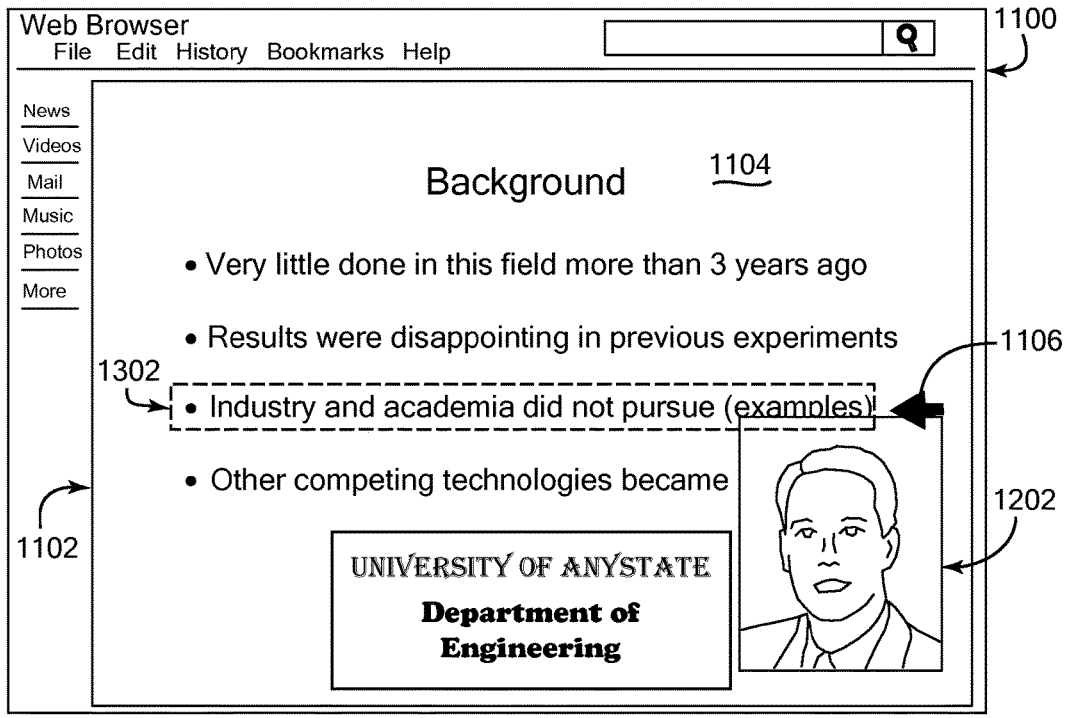

In FIG. 13, the system displays presentation 1102 including slide 1104 that does not have at least a threshold change in its pixels, and including user pointer 1106 after the user pointer 1106 has been moved based on user input. For example, the user pointer 1106 now points to a portion 1302 of the slide, such as a text portion associated with a bullet point of the slide different than the text portion pointed to in FIGS. 11-12. In this example, a portion of the moved user pointer 1106 overlaps a portion of the displayed speaker video stream 1202. In addition, a portion of the displayed speaker video stream 1202 overlaps or obscures a portion of the text portion 1302 pointed to by the user pointer 1106. Either of these conditions can cause the system to reduce the visibility of the speaker video stream, e.g., causing the speaker video stream to no longer have any portion of its display area in the same display area as the user pointer 1106 and the text portion 1302 pointed to by user pointer 1106. For example, at this point in the presentation, the user pointer 1106 and text portion 1302 can be considered to have a higher presentation priority, e.g., are a more important focus of attention for viewers of the presentation 1102, than the speaker video stream 1202. Some implementations can cause the reduction in visibility of the speaker video stream if the user pointer 1106 or text portion 1302 are positioned within a threshold distance (e.g., in pixels) of the speaker video stream.

Figure 14:
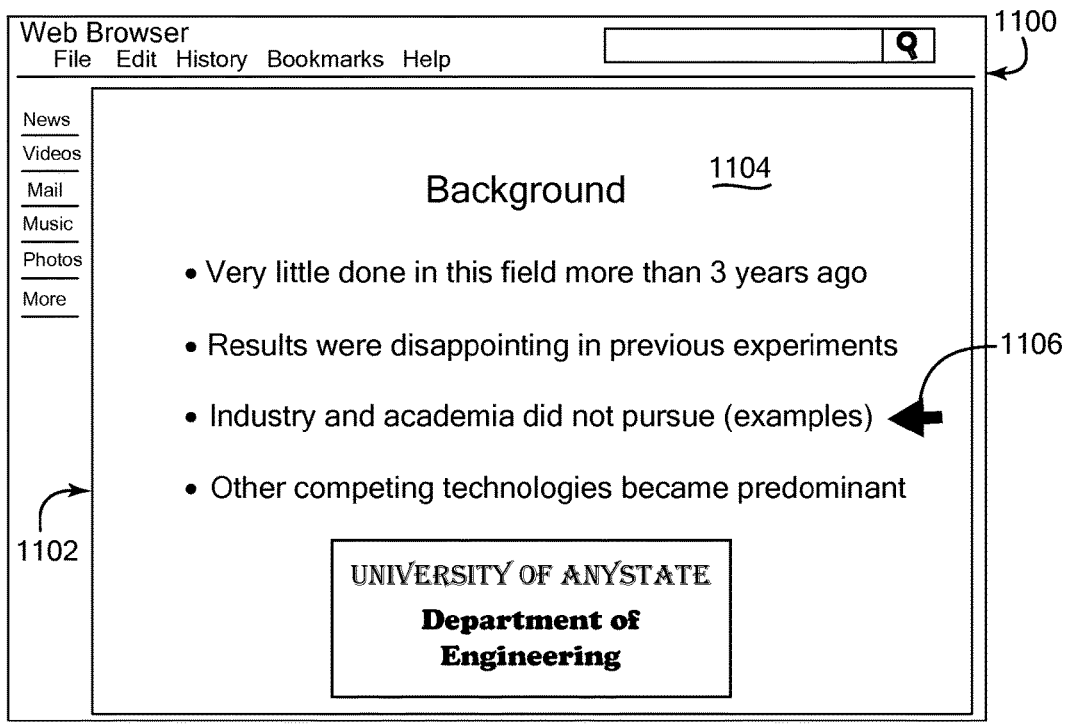

In the example of FIG. 14, the system has removed the speaker video stream 1202 from the presentation 1102 based on the determinations described above for FIG. 13. Other implementations can reduce the size of the speaker video stream, move the speaker video stream to a position further from the user pointer 1106 and/or further from the text portion 1302, etc.

Various implementations can present various options to a user (e.g., a speaker) to input parameters that can govern the determination of presentation priorities of visual content and/or a layout of displaying visual content in a computer presentation. For example, the user can be prompted to input one or more predetermined threshold time periods, change thresholds, distance thresholds for user pointers, etc. The user can be prompted to input one or more preferences as to displaying second visual content in relation to first visual content. In some implementations, these preferences may be set by a speaker or an individual viewer of the presentation. For example, if the computer presentation is being viewed on multiple client devices, an individual viewer viewing the presentation at each associated client device can provide preferences for the presentation indicating or influencing the display of the presentation on the associated client device. For example, some viewers may prefer a full-screen slide view for a longer duration (e.g., a greater threshold time period) than a speaker-specified threshold time period. In another example, some viewers may prefer a side-by-side presentation when speaker visibility is improved and a full screen slide when speaker visibility is reduced, which is different than other viewers' preferences, etc.

It should be noted that the blocks of any of the methods described herein can be performed in a different order than shown and/or simultaneously (partially or completely) with other blocks, where appropriate. Not all of the described blocks need be performed in various implementations. In some implementations, blocks can be performed multiple times, in a different order, and/or at different times in the methods.

Methods described herein can be implemented by program instructions or code, which can be executed on a computer, e.g., implemented by one or more processors, such as microprocessors or other processing circuitry and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. One or more methods can be performed as part of or component of an application running on the system, or as an application or software running in conjunction with other applications and operating system.

In some implementations, one or more methods can be implemented in conjunction with display of a user interface on an output device of a system. For example, the user interface can be a graphical user interface (GUI) displayed on a display of a server device or client device, e.g., a camera, phone, tablet, goggles, wearable device (watch, jewelry, etc.), laptop computer, desktop computer, head mounted display, etc. The GUI can offer menus and selections for the user to select and manipulate with an input device, e.g., a touchscreen, mouse, trackpad, voice recognition microphone, etc. For example, the user interface can be provided by a presentation display application, communication application, or other type of application, in some implementations.

Figure 15:
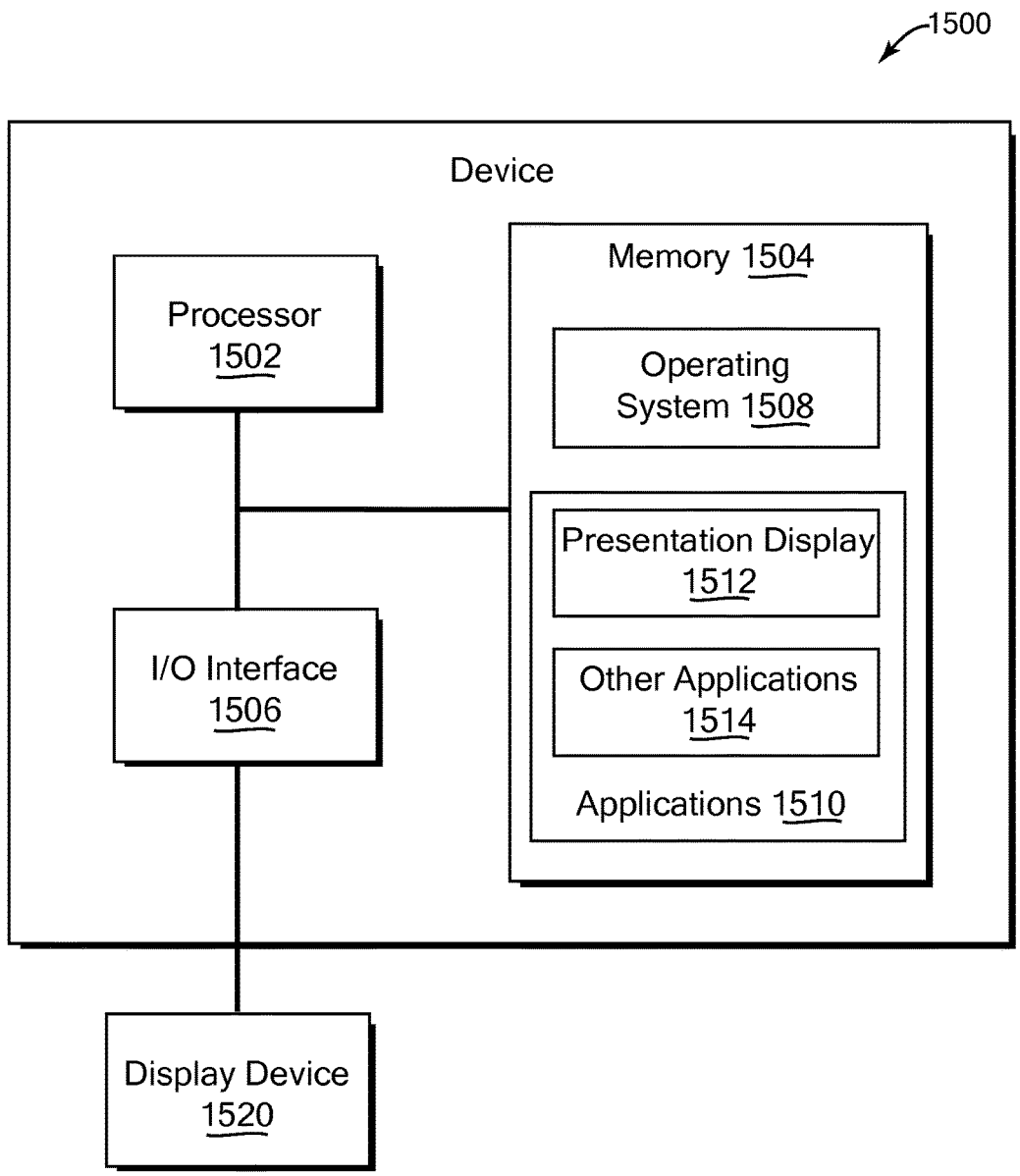
FIG. 15 is a block diagram of an example device which may be used for one or more implementations described herein.

FIG. 15 is a block diagram of an example device 1500 which may be used to implement some implementations described herein. In some implementations, device 1500 may be a computer device used to implement a server device, e.g., server device 104 of FIG. 1, and perform appropriate method implementations described herein. Server device 1500 can be any suitable computer system, server, or other electronic or hardware device. For example, the server device 1500 can be a mainframe computer, desktop computer, workstation, portable computer, or electronic device (portable device, cell phone, smart phone, tablet computer, television, TV set top box, personal digital assistant (PDA), media player, wearable device, game device, etc.). In some implementations, server device 1500 includes a processor 1502, a memory 1504, and input/output (I/O) interface 1506.

Processor 1502 can be one or more processors or processing circuits to execute program code and control basic operations of the device 1500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1504 is typically provided in device 1500 for access by the processor 1502, and may be any suitable processor-readable non-transitory storage medium, such as random access memory (RAM), read-only memory (ROM), Electrical Erasable Read-only Memory (EEPROM), Flash memory, etc., suitable for storing instructions for execution by the processor, and located separate from processor 1502 and/or integrated therewith. Memory 1504 can store software operating on the server device 1500 by the processor 1502, including an operating system 1508 and one or more applications 1510 such as a graphics editing engine, web hosting engine, social networking engine, etc. In some implementations, applications 1510 can include instructions that enable processor 1502 to perform the functions described herein, e.g., some or all of the methods of FIGS. 2-5. For example, applications 1510 can include one or more presentation display engines 1512, including an application to display computer presentations having visual content from multiple sources (e.g., video and other streams of data) on a display component of the device. A presentation display application, for example, can provide a displayed user interface responsive to user input to display computer presentations with selected options. Other applications or engines 1514 can also or alternatively be included in applications 1510, e.g., graphics or image editing applications, communication applications, web hosting engine or application, social networking engine or application, etc. Any of software in memory 1504 can alternatively be stored on any other suitable storage location or computer-readable medium. In addition, memory 1504 (and/or other connected storage device(s)) can store received visual content (e.g., video and data streams and/or images), thresholds, user preferences, and/or other instructions and data used in the features described herein. Memory 1504 and any other type of storage (magnetic disk, optical disk, magnetic tape, or other tangible media) can be considered "storage devices."

I/O interface 1506 can provide functions to enable interfacing the server device 1500 with other systems and devices. For example, network communication devices, storage devices such as memory and/or database 106, and input/output devices can communicate via interface 1506. In some implementations, the I/O interface can connect to interface devices such as input devices (keyboard, pointing device, touchscreen, microphone, camera, scanner, etc.) and output devices (display device, speaker devices, printer, motor, etc.). A display device 1520 is one example of an output device that can be used to display content, e.g., content included in a computer presentation as described herein. Display device 1520 can be connected to device 1500 via local connections (e.g., display bus) and/or via networked connections and can be any suitable display device, some examples of which are described below.

For ease of illustration, FIG. 15 shows one block for each of processor 1502, memory 1504, I/O interface 1506, and software blocks 1508 and 1510. These blocks may represent one or more processors or processing circuitries, operating systems, memories, I/O interfaces, applications, and/or software modules. In other implementations, server device 1500 may not have all of the components shown and/or may have other elements including other types of elements instead of, or in addition to, those shown herein. While system 102 is described as performing blocks and operations as described in some implementations herein, any suitable component or combination of components of system 102 or similar system, or any suitable processor or processors associated with such a system, may perform the blocks and operations described.

A client device can also implement and/or be used with one or more features described herein, such as any of client devices 120-126 shown in FIG. 1. Example client devices can be computer devices including some similar components as the device 1500, such as processor(s) 1502, memory 1504, and I/O interface 1506. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device 1520, for example, can be connected to (or included in) the device 1500 to display the images pre- and post-processing as described herein, where such device can include any suitable display device such as an LCD, LED, or plasma display screen, CRT, television, monitor, touchscreen, 3-D display screen, projector, or other visual display device. Some implementations can provide an audio output device, such as voice output or synthesis that speaks text.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to display visual content in a computer presentation, the method comprising:
obtaining first visual content and second visual content associated with the first visual content, wherein the first visual content and the second visual content include a plurality of pixels, wherein the first visual content is from a computer presentation and includes a plurality of different portions that are simultaneously displayed, wherein the different portions are associated with respective presentation priorities;
causing the first visual content and the second visual content to be displayed by a display device, wherein the second visual content is displayed without overlap of the first visual content;
determining that user input to a device designates at least one portion of the different portions of the first visual content;
determining that a first presentation priority of a first portion of the first visual content is reduced relative to one or more other presentation priorities of one or more other portions of the first visual content based on a determination that, for at least a threshold period of time, fewer than a threshold number of pixels of the first visual content have changed and that the first portion of the first visual content is different than the at least one portion designated by the user input; and
in response to determining that the first presentation priority of the first portion of the first visual content is reduced, causing the second visual content to be displayed overlapping the first portion of the first visual content.

2. The computer-implemented method of claim 1 wherein the first visual content and the second visual content are different types of content, where the different types of content include two or more of text, image, video, or audio.

3. The computer-implemented method of claim 1 wherein the first portion of the first visual content being overlapped by the second visual content is not displayed in the computer presentation.

4. The computer-implemented method of claim 3 wherein the user input controls a position of a visual pointer in the computer presentation, and wherein determination that the first portion of the first visual content is different than the at least one portion designated by the user input includes a determination that the first portion of the first visual content is not pointed to by the visual pointer.

5. The computer-implemented method of claim 4 further comprising, after causing the second visual content to be displayed overlapping the first portion of the first visual content:
determining whether the visual pointer is moved to a position corresponding to the overlapped first portion of the first visual content; and
in response to determining that the visual pointer is moved to the position corresponding to the overlapped first portion of the first visual content, causing display of the overlapped first portion of the first visual content in the computer presentation.

6. The computer-implemented method of claim 1 further comprising causing display of a visual pointer in the computer presentation at a displayed position based on the user input, wherein reducing the first presentation priority is in response to determining that the displayed position has a change that is below a threshold change for at least the threshold period of time.

7. The computer-implemented method of claim 6 wherein determining that the first presentation priority is reduced is in response to determining that a distance of the displayed position of the visual pointer in the computer presentation is at least a threshold distance from the displayed position of the first visual content.

8. The computer-implemented method of claim 6 wherein determining that the first presentation priority is reduced is further in response to determining that the displayed position of the visual pointer references the display of the first visual content.

9. The computer-implemented method of claim 1 wherein the threshold period of time is a first threshold period of time, and further comprising:
after determining that the first presentation priority is reduced, determining that the first presentation priority is additionally reduced based on a determination that, for at least a second threshold period of time after the first threshold period of time, less than the threshold number of pixels of the first visual content have changed; and
in response to determining that the first presentation priority is additionally reduced, enlarging a size of the display of the second visual content in addition to modifying the display of the second visual content to overlap the first portion of the first visual content.

10. The computer-implemented method of claim 1 wherein the first visual content includes a sequence of slides and the second visual content includes audio data derived from verbal speech provided by at least one associated user, and further comprising:
detecting whether one or more spoken words detected in the audio data correspond with one or more text words displayed in the sequence of slides, and
in response to detecting that the one or more spoken words detected in the audio data correspond with one or more text words, increasing the first presentation priority of the sequence of slides.

11. A computer-implemented method to display visual content in a computer presentation, the method comprising:
obtaining first visual content and second visual content associated with the first visual content, wherein the first visual content and the second visual content include a plurality of pixels, wherein the second visual content includes audio data derived from verbal speech provided by at least one user associated with the computer presentation;
causing the first visual content and the second visual content to be displayed by a display device;
determining that a first presentation priority of the first visual content is reduced based on a determination that, for at least a threshold period of time, fewer than a threshold number of pixels of the first visual content have changed;
in response to determining that the first presentation priority is reduced, improving a visibility of a display of the second visual content in the computer presentation;
detecting one or more spoken words in the audio data;
detecting whether the one or more spoken words in the audio data correspond with one or more text words displayed in the first visual content;
in response to detecting that the one or more spoken words in the audio data correspond with one or more text words, determining that a first presentation priority of the first visual content has increased; and
in response to determining that the first presentation priority has increased, improving a visibility of a display of the first visual content in the computer presentation.

12. The computer-implemented method of claim 11 wherein improving a visibility of a display of the first visual content includes at least one of: increasing a size of the first visual content as displayed relative to the second visual content, causing the first visual content to be displayed at least partially overlapping the second visual content, or changing a position of the first visual content closer to a center position of the computer presentation.

13. The computer-implemented method of claim 11 wherein improving the visibility of the display of the second visual content in the computer presentation includes causing the second visual content to be displayed at least partially overlapping the first visual content such that an overlapped portion of the first visual content is not displayed.

14. The computer-implemented method of claim 11 wherein improving the visibility of the display of the first visual content in the computer presentation includes causing display of the first visual content to at least partially overlap the second visual content such that an overlapped portion of the second visual content is not displayed.

15. The computer-implemented method of claim 11 wherein the first visual content includes a sequence of slides and the second visual content includes a video depicting the at least one user associated with the computer presentation.

16. The computer-implemented method of claim 11 further comprising:
  determining a pointer position in the first visual content based on the audio data; and
  causing display of a visual pointer at the pointer position.

17. The computer-implemented method of claim 16 wherein determining the pointer position in the first visual content based on the audio data includes determining a particular portion of the first visual content that includes the one or more text words corresponding to the one or more spoken words.

18. The computer-implemented method of claim 11 wherein the first visual content is divided into a plurality of different portions simultaneously displayed, wherein the different portions are associated with a plurality of respective presentation priorities, and wherein detecting whether the one or more spoken words in the audio data correspond with one or more text words displayed in the first visual content includes detecting whether the one or more text words are displayed in one portion of the plurality of different portions of the first visual content.

19. A system to display visual content in a computer presentation, the system comprising:
  a storage device; and
  at least one processor operative to access the storage device and operative to perform operations comprising:
  obtaining first visual content and second visual content associated with the first visual content, wherein the first visual content and the second visual content include a plurality of pixels, wherein the first visual content is from a computer presentation and includes a plurality of different portions that are simultaneously displayed, wherein the different portions are associated with respective presentation priorities;
  causing the first visual content and the second visual content to be displayed by a display device, wherein the second visual content is displayed without overlap of the first visual content;
  determining that user input to a device designates at least one portion of the different portions of the first visual content;
  determining that a first presentation priority of a first portion of the first visual content is reduced relative to one or more other presentation priorities of one or more other portions of the first visual content based on a determination that, for at least a threshold period of time, fewer than a threshold number of pixels of the first visual content have changed and that the first portion of the first visual content is different than the at least one portion designated by the user input; and
  in response to determining that the first presentation priority of the first portion of the first visual content is reduced, causing the second visual content to be displayed overlapping the first portion of the first visual content.

20. The system of claim 19 wherein the user input controls a position of a visual pointer in the computer presentation, and wherein determination that the first portion of the first visual content is different than the at least one portion designated by the user input includes a determination that the first portion of the first visual content is not pointed to by the visual pointer.

* * * * *